United States Patent
Watanabe

(10) Patent No.: US 6,771,853 B2
(45) Date of Patent: Aug. 3, 2004

(54) OPTICAL FIBER COMMUNICATION SYSTEM USING OPTICAL PHASE CONJUGATION AS WELL AS APPARATUS APPLICABLE TO THE SYSTEM AND METHOD OF PRODUCING THE SAME

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 10/229,011

(22) Filed: Aug. 28, 2002

(65) Prior Publication Data

US 2003/0035618 A1 Feb. 20, 2003

Related U.S. Application Data

(62) Division of application No. 09/873,360, filed on Jun. 5, 2001, now Pat. No. 6,504,972, which is a division of application No. 09/051,788, filed on Apr. 20, 1998, now Pat. No. 6,307,984.

(30) Foreign Application Priority Data

Aug. 22, 1996 (JP) ............................................. 8-221274
Aug. 22, 1997 (JP) ................................. PCT/JP97/02926

(51) Int. Cl.$^7$ .............................................. G02B 6/28
(52) U.S. Cl. ....................................... 385/24; 398/150
(58) Field of Search ........................ 385/24; 359/332; 398/150

(56) References Cited

U.S. PATENT DOCUMENTS

| | | | | |
|---|---|---|---|---|
| 5,365,362 A | * | 11/1994 | Gnauck et al. | ............. 398/150 |
| 5,386,314 A | | 1/1995 | Jopson | |
| 5,532,868 A | * | 7/1996 | Gnauck et al. | ............. 359/332 |
| 5,550,671 A | | 8/1996 | Simpson et al. | |
| 5,568,583 A | | 10/1996 | Akasaka et al. | |
| 5,777,770 A | * | 7/1998 | Naito | ......................... 398/150 |
| 6,304,348 B1 | * | 10/2001 | Watanabe | ....................... 398/9 |
| 6,307,984 B1 | * | 10/2001 | Watanabe | ..................... 385/24 |
| 6,504,972 B2 | * | 1/2003 | Watanabe | ..................... 385/24 |

FOREIGN PATENT DOCUMENTS

| | | | |
|---|---|---|---|
| EP | 0987583 A2 | * 3/2000 | ............. G02F/1/35 |
| JP | 60-173504 | 9/1985 | |
| JP | 62-159104 | 7/1987 | |
| JP | 5-323396 | 12/1993 | |
| JP | 7-301830 | 11/1995 | |
| JP | 8-95106 | 4/1996 | |

OTHER PUBLICATIONS

Watanabe et al., "Simultaneous Wavelength Conversion and Optica Phase conjugation of 200 Gb/s (5 =40 GB/s) WDM Signal using a highly conlinear fiber four –wave mixer", Sep. 1997, Conference Publication No. 448, pp 1–4.*

(List continued on next page.)

Primary Examiner—Ellen E. Kim
(74) Attorney, Agent, or Firm—Staas & Halsey LLP

(57) ABSTRACT

An optical fiber communication system according to the present invention has, for example, first and second phase conjugators. The first phase conjugator converts a signal beam from a first optical fiber into a first phase conjugate beam. The first phase conjugate beam is supplied to the second phase conjugator by a second optical fiber. The second phase conjugator converts the first phase conjugate beam into a second phase conjugate beam. The second phase conjugate beam is transmitted by a third optical fiber. The second optical fiber is composed of a first portion located between the first phase conjugator and a system midpoint and a second portion located between the system midpoint and the second phase conjugator. The total dispersion of the first optical fiber substantially coincides with the total dispersion of the first portion, and the total dispersion of the second portion substantially coincides with the total dispersion of the third optical fiber. By the construction, waveform distortion by chromatic dispersion or nonlinearity is compensated for.

4 Claims, 25 Drawing Sheets

OTHER PUBLICATIONS

Moore, "A model for diffraction–limited high–power multimode fiber amplifiers using seeded stimulated brillouin scattering phas conjugation", Jun. 2001, IEEE Journal of quantum electronics, pp 781–789.*

S. Watanabe, M. Shirasaki, "Exact Compensation for Both Chromatic Dispersion and Kerr Effect in a Transmission Fiber Using Optical Phase Conjugation," Journal of Lightwave Technology, vol. 14, No. 3, Mar. 1996, pps. 243–248.

"Laser Study" (in Japanese), The Society of Laser Engineers (30 06 96), vol. 24, No. 6, pps. 649–655.

S. Watanabe, "Cancellation of Four–Wave Mixing in a Single–Mode Fiber by Midway Optical Phase Conjugation," Optics Letters, vol. 19, No. 17, Sep. 1, 1994, pps. 1308–1310.

Inoue, "Suppression Technique for Fiber Four–Wave Mixng Using Optical Multi–Demultiplexers and a Delay Line", Mar. 1993, Journal of Lightwave Technology, vol. 11, No. 33, pp. 455–461.

Hedekvist et al., "Impact of Spectral Inverter Fiber Length on Four Wave Mixing Efficiency and Signal Distortion", Sep. 1995, Journal of Lightwave Technology, vol. 13, No. 9, pp. 1815–1819.

Kikuchi et al., "Design of Highly Efficient Four–Wave Mixing Devices Using Optical Fibers", IEEE Photonics Technology Letters, vol. 6, No. 8, pp. 992–994.

Inoue et al., "Wavelength Conversion Experiment Using Fiber Four–Wave Mixing", Jan. 1992, IEEE Photonics Technology Letters, vol. 4, No. 1, pp. 69–72.

* cited by examiner

OPTICAL FIBER COMMUNICATION SYSTEM USING OPTICAL PHASE CONJUGATION AS WELL AS APPARATUS APPLICABLE TO THE SYSTEM AND METHOD OF PRODUCING THE SAME

This application is a divisional of application Ser. No. 09/873,360, filed Jun. 5, 2001 now U.S. Pat. No. 6,504,972, which is a divisional of Ser. No. 09/051,788 filed Apr. 20, 1998 now U.S. Pat. No. 6,307,984.

TECHNICAL FIELD

This invention relates to an optical fiber communication system using optical phase conjugation as well as an apparatus applicable to the system and a method of producing the same.

BACKGROUND ART

As a result of development of a silica optical fiber of low loss, many optical fiber communication systems wherein an optical fiber is used for a transmission line have been put into practical use. An optical fiber itself has a very broad band. However, the transmission capacity by an optical fiber is actually limited by system designing. The most significant limitation arises from waveform distortion by chromatic dispersion which occurs in an optical fiber. Further, while an optical fiber attenuates an optical signal, for example, at the rate of approximately 0.2 dB/km, the loss by such attenuation has been compensated for by adoption of optical amplifiers including an erbium-doped fiber amplifier (EDFA).

Chromatic dispersion often simply called dispersion is a phenomenon wherein the group velocity of an optical signal in an optical fiber varies as a function of the wavelength (frequency) of the optical signal. For example, in a standard single mode fiber, where the wavelength is shorter than 1.3 $\mu$m, an optical signal having a longer wavelength propagates faster than another optical signal having a shorter wavelength, and dispersion as a result of this is usually called normal dispersion. Where the wavelength is longer than 1.3 $\mu$m, an optical signal having a shorter wavelength propagates faster than another optical signal having a longer wavelength, and dispersion as a result of this is called anomalous dispersion.

In recent years, originating from an increase in optical signal power by adoption of an EDFA, attention is paid to the nonlinearity. The most significant nonlinearity of an optical fiber which limits the transmission capacity is an optical Kerr effect. The optical Kerr effect is a phenomenon wherein the refractive index of an optical fiber varies in accordance with the intensity of an optical signal. The variation of the refractive index modulates the phase of an optical signal which propagates in an optical fiber, and as a result, frequency chirping which varies the signal spectrum occurs. This phenomenon is known as self-phase modulation (SPM). The spectrum is expanded by the SPM, by which the waveform distortion by chromatic dispersion is further increased.

In this manner, the chromatic dispersion and the Kerr effect provide waveform distortion to an optical signal as the transmission distance increases. Accordingly, in order to allow long-haul transmission by an optical fiber, it is required that the chromatic dispersion and the nonlinearity be controlled, compensated for or suppressed.

As a technique for controlling the chromatic dispersion and the nonlinearity, a technique which employs a regenerative repeater which includes an electronic circuit for a main signal is known. For example, a plurality of regenerative repeaters are disposed intermediately of a transmission line, and in each of the regenerative repeaters, photo-electric conversion, regeneration processing and electro-optical conversion are performed in this order before the waveform distortion of the optical signal becomes excessive. This method, however, has a problem in that a regenerative repeater which is expensive and complicated is required and an electronic circuit of the regenerative repeater limits the bit rate of a main signal.

As a technique for compensating for the chromatic dispersion and the nonlinearity, a light soliton is known. Optical signal pulses having an amplitude, a pulse width and a peak power defined accurately with respect to a given value of the anomalous dispersion are generated, and consequently, a light soliton propagates while it maintains its waveform because of balancing between pulse compression which arises from the SPM and the anomalous dispersion by the optical Kerr effect and pulse expansion by the dispersion.

As another technique for compensating for the chromatic dispersion and the nonlinearity, application of optical phase conjugation is available. For example, a method for compensating for the chromatic dispersion of a transmission line has been proposed by Yariv et al. (A. Yariv, D. Fekete, and D. M. Pepper, Compensation for channel dispersion by nonlinear optical phase conjugation" Opt. Lett., vol. 4, pp. 52–54, 1979). An optical signal is converted into phase conjugate light at a middle point of a transmission line, and waveform distortion by chromatic dispersion which the optical signal has undergone in the former half of the transmission line is compensated for by distortion by chromatic dispersion in the latter half of the transmission line.

Particularly, if it is assumed that the factors of the phase variation of an electric field at two locations are same and the variation in environment which brings about the factors is moderate within a transmission time of light between the two locations, then the phase variation is compensated for by disposing a phase conjugator (phase conjugate light generating apparatus) intermediately between the two locations (S. Watanabe, "Compensation of phase fluctuation in a transmission line by optical conjugation" Opt. Lett., vol. 17, pp. 1,355–1,357, 1992). Accordingly, by adoption of a phase conjugator, also waveform distortion which arises from SPM is compensated for. However, where the distribution of the optical power is asymmetrical before and after the phase conjugator, the compensation for the nonlinearity becomes incomplete.

The inventor of the present invention has proposed a technique for overcoming the incompleteness of the compensation by the nonlinearity of the optical power where a phase conjugator is used (S. Watanabe and M. Shirasaki, "Exact compensation for both chromatic dispersion and Kerr effect in a transmission fiber using optical phase conjugation" J. Lightwave Technol., vol. 14, pp. 243–248, 1996). A phase conjugator is disposed in the proximity of a point of a transmission line before and after which the total amounts of the dispersion values or the nonlinear effect are equal, and various parameters before and after the point are set for each small interval. However, since a phase conjugator is disposed intermediately of the transmission line, where the transmission line is laid between continents, for example, the phase conjugator may possibly be laid on the bottom of the sea. In this instance, maintenance of the phase conjugator is difficult. It may be proposed to dispose a front half portion or a rear half portion of a transmission line in a transmission terminal station or a reception terminal station and lay the remaining half of the transmission line between continents. In this instance, since the phase conjugator can be provided in the transmission terminal station or the reception terminal station, maintenance of it is easy. However, in this instance, a deviation may appear in setting of parameters between the front half portion and the rear half portion of the transmission line and may make the compensation incomplete.

It is an object of the present invention to provide an optical fiber communication system wherein the chromatic dispersion and the nonlinearity can be compensated for effectively by using two or more phase conjugators.

It is another object of the present invention to provide an optical fiber communication system wherein a phase conjugator need not be disposed intermediately of a transmission line in order to compensate for the chromatic dispersion and the nonlinearity.

Other objects of the present invention become apparent from the following description.

DISCLOSURE OF THE INVENTION

According to the present invention, there is provided an optical fiber communication system which includes first and second phase conjugators. A signal beam is supplied to the first phase conjugator by a first optical fiber. The first phase conjugator converts the signal beam into a first phase conjugate beam and outputs the first phase conjugate beam. The first phase conjugate beam is supplied to the second phase conjugator by a second optical fiber. The second phase conjugator converts the first phase conjugate beam into a second phase conjugate beam and outputs the second phase conjugate beam. The second phase conjugate beam is transmitted by a third optical fiber. A system midpoint is set intermediately of the second optical fiber. In particular, the second optical fiber is composed of a first portion located between the first phase conjugator and the system midpoint and a second portion located between the system midpoint and the second phase conjugator. The total dispersion (product of an average value of the chromatic dispersion and the length) of the first optical fiber substantially coincides with the total dispersion of the first portion, and the total dispersion of the second portion substantially coincides with the total dispersion of the third optical fiber. Detailed design examples of individual parameters are hereinafter described.

By such parameter setting, the chromatic dispersion and the nonlinearity are compensated for effectively. Further, since the waveform distortion exhibits a minimum value at the system midpoint using the two phase conjugators, the phase conjugators need not be disposed intermediately of the transmission line. According to the present invention, not only the optical Kerr effect but also other nonlinearities such as a Raman effect are compensated for.

Preferably, a plurality of optical amplifiers are provided on the optical path including the first, second and third optical fibers. Even if noise which is generated by the optical amplifiers is accumulated, according to the present invention, since the waveform of the optical signal restores its original waveform once at the system midpoint, the noise can be removed effectively by an optical band-pass filter in the proximity of the system midpoint. In other words, in the present invention, since the signal spectrum at the system midpoint is as narrow as the original signal spectrum, use of an optical band-pass filter having a narrow pass-band for removing noise is allowed.

BEST MODE FOR CARRYING OUT THE INVENTION

In the following, preferred embodiments of the present invention are described in detail with reference to the accompanying drawings.

Figure 1:
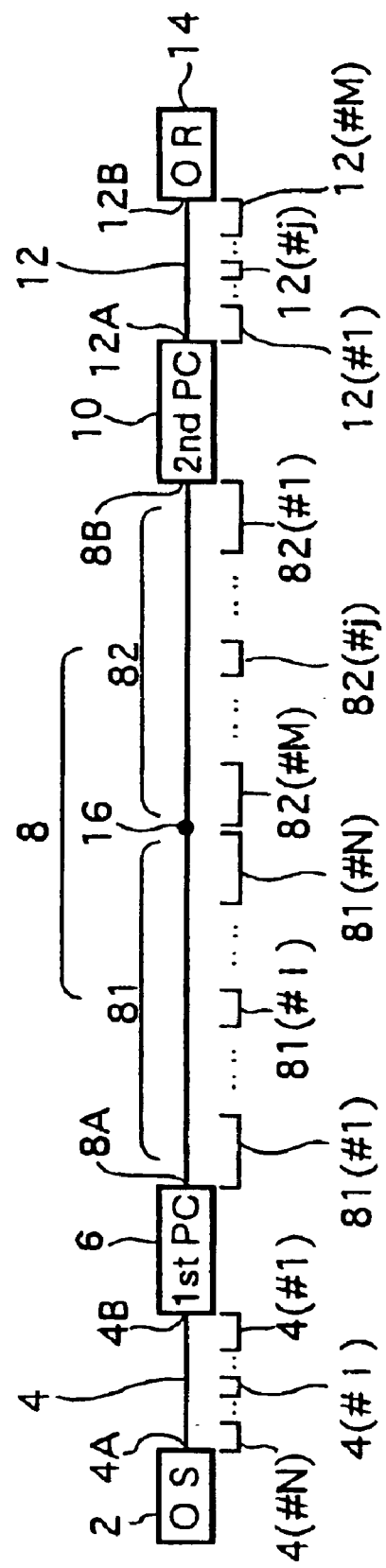
FIG. 1 is a block diagram showing a basic construction of an optical fiber communication system of the present invention.

Referring to FIG. 1, there is shown a basic construction of the optical fiber communication system of the present invention. An optical transmitter (OS) 2 outputs a signal beam. A first optical fiber 4 has a first end 4A and a second end 4B which serve as an input end and an output end for the signal beam, respectively. A first phase conjugator (1st PC) 6 is operatively connected to the second end 4B.

In the present application, the terminology that a certain element and another element are operatively connected to each other includes a case wherein the elements are connected directly to each other and also includes a case wherein the elements are provided in such a degree of connection that communication of an optical signal (or electric signal) is possible between the elements.

The first phase conjugator 6 converts a signal beam supplied thereto from the first optical fiber 4 into a first phase conjugate beam and outputs the first phase conjugate beam. A second optical fiber 8 has a third end 8A and a fourth end 8B which serve as an input end and an output end for the first phase conjugate beam, respectively. A second phase conjugator (2nd PC) 10 is operatively connected to the fourth end 8B. The second phase conjugator 10 converts the first phase conjugate beam supplied thereto from the second optical fiber 8 into a second phase conjugate beam and outputs the second phase conjugate beam. A third optical fiber 12 has a fifth end 12A and a sixth end 12B which serve as an input end and an output end for the second phase conjugate beam, respectively. In order to receive the second phase conjugate beam transmitted by the third optical fiber 12, an optical receiver (OR) 14 is provided.

A system midpoint 16 is set intermediately of the second optical fiber 8. The system midpoint 16 is defined, for example, as a point at which waveform distortion is minimized, and a detailed position of the point is hereinafter described. The second optical fiber 8 is composed of a first portion 81 located between the third end 8A and the system midpoint 16 and a second portion 82 located between the system midpoint 16 and the fourth end 8B.

Parameters of the optical fibers 4, 8 and 12 are set, for example, in the following manner.

First, the first optical fiber 4 is imaginarily divided into N (N is an integer larger than 1) intervals (or sections) 4 (#1, ..., #N), and also the first portion 81 of the second optical fiber 8 is imaginarily divided into an equal number of intervals 81 (#1, ..., #N). In this instance, the first optical fiber 4 and the first portion 81 of the second optical fiber 8 are imaginarily divided such that products of average values of chromatic dispersion and interval lengths of each two mutually corresponding intervals as counted from the first phase conjugator 6 are equal to each other. More particularly, where the average value of chromatic dispersion (or dispersion parameter) and the interval length of the i-th (1≤i≤N) interval 4 (#i) of the first optical fiber 4 as counted from the first phase conjugator 6 are represented by $D_{1i}$ and $L_{1i}$, respectively, and the average value of chromatic dispersion (or dispersion parameter) and the interval length of the i-th interval 81 (#i) of the first portion 81 of the second optical fiber 8 as counted from the first phase conjugator 6 are represented by $D_{2i}$ and $L_{2i}$, respectively, $$D_{1i}L_{1i} = D_{2i}L_{2i} \quad (1)$$

is satisfied. Further, where the average value of optical power and the average value of non-linear coefficient of the interval 4 (#i) are represented by $P_{1i}$ and $\gamma_{1i}$, respectively, and the average value of optical power and the average value of non-linear coefficient of the interval 81 (#i) are represented by $P_{2i}$ and $\gamma_{2i}$, respectively, $$P_{1i}\gamma_{1i}L_{1i} = P_{2i}\gamma_{2i}L_{2i} \quad (2)$$

is satisfied.

Meanwhile, the second portion 82 of the second optical fiber 8 is imaginarily divided into M (M is an integer larger than 1) intervals 82 (#1, ..., #M), and also the third optical fiber 12 is divided into an equal number of intervals 12 (#1, ..., #M). In this instance, where the average value of chromatic dispersion and the interval length of the j-th (1≤j≤M) interval 82 (#i) of the second portion 82 of the second optical fiber 8 as counted from the second phase conjugator 10 are represented by $D_{3j}$ and $L_{3j}$, respectively, and the average value of chromatic dispersion and the interval length of the j-th interval 12 (#j) of the third optical fiber 12 as counted from the second phase conjugator 10 are represented by $D_{4j}$ and $L_{4j}$, respectively, $$D_{3j}L_{3j} = D_{4j}L_{4j} \quad (3)$$

is satisfied. Further, where the average value of optical power and the average value of non-linear coefficient of the interval 82 (#j) are represented by $P_{3j}$, and $\gamma_{3j}$, respectively, and the average value of optical power and the average value of non-linear coefficient of the interval 12 (#j) are represented by $P_{4j}$ and $\gamma_{4j}$, respectively, $$P_{3j}\gamma_{3j}L_{3j} = P_{4j}\gamma_{4j}L_{4j} \quad (4)$$

is satisfied.

In the system of FIG. 1, while the wavelength distortion exhibits a higher value once before and after the first phase conjugator 6, by the conditions of the expressions (1) and (2), the chromatic dispersion and the nonlinearity are compensated for at the system midpoint 16, and the waveform restores its original state once. While the thus restored waveform is distorted before and after the second phase conjugator 10 again, by the conditions of the Expressions (3) and (4), the chromatic dispersion and the nonlinearity are compensated for at the optical receiver 14, and consequently, the waveform restores its original waveform again.

Further, the system of the present invention is tolerant of setting errors of parameters such as the length as to the second optical fiber 8 which may possibly be laid on the bottom of the sea or the like. In particular, even if the waveform does not completely restore its original state at the system midpoint 16, the waveform can be returned substantially completely to its original waveform at the optical receiver 14 by reproducing the incompleteness by the second portion 82, second phase conjugator 10 and third optical fiber 12.

Figure 2:
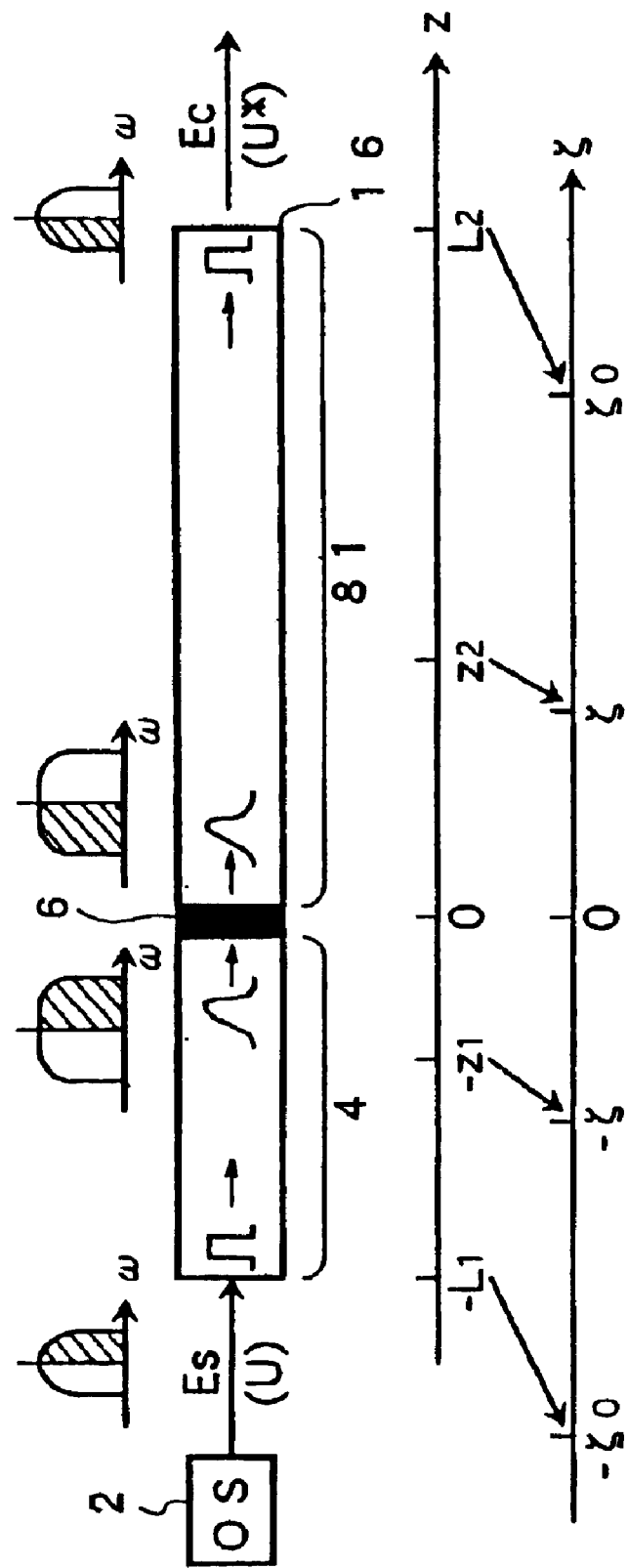
FIG. 2 is a diagrammatic view illustrating a principle of compensation in the system of FIG. 1.

Referring to FIG. 2, there is illustrated a principle of compensation for chromatic dispersion and nonlinearity.

Here, a principle of compensation from the optical transmitter 2 to the system midpoint 16 is described. First, prior to description of FIG. 2, general matters of a phase conjugate wave are described.

Propagation of an optical signal E(x, y, z, t)=F(x, y)φ(z, t)exp[i(ωt−kz)] in optical fiber transmission can generally be described by a nonlinear wave equation given below. Here, F(x, y) represents the mode distribution in a lateral direction and φ(z, t) represents the complex envelope of light. It is assumed that φ(z, t) here varies sufficiently slowly comparing with the frequency ω of the light.

$$i\frac{\partial \phi}{\partial z} - (1/2)\beta_2 \frac{\partial^2 \phi}{\partial T^2} + \gamma|\phi|^2\phi = -(i/2)\alpha\phi \tag{5}$$

where T=t−β₁z (β₁ is a propagation constant), α is the loss of the fiber, β₂ is the chromatic dispersion of the fiber, and $$\gamma = \frac{\omega n_2}{c A_{eff}} \tag{6}$$

represents the third-order nonlinear coefficient (coefficient of an optical Kerr effect). Here, $n_2$ and $A_{eff}$ represent the nonlinear refractive index and the effective core sectional area of the fiber, respectively. c represents the velocity of light in the vacuum. Here, up to first-order dispersion is taken into consideration, and higher order dispersion is omitted. Further, it is assumed that α,β₂ and γ are functions of z, which are represented as α(z),β₂(z) and γ(z), respectively. Furthermore, the position of the phase conjugator is determined as an origin (z=0). Here, the following normalization function is used:

$$\phi(z,T)=A(z)u(z,T) \tag{7}$$

where $$A(z) \equiv A(0)\exp\left[-(1/2)\int_0^z \alpha(z)dz\right] \tag{8}$$

represents the amplitude, and where α(z)>0, this represents that the transmission line has a loss, but where α(z)<0, this represents that the transmission line has a gain. A(z)≡A(0) represents the case where the transmission has no loss. Meanwhile, A(z)²=·P(z) corresponds to the optical power. By substituting the expressions (7) and (8) into the expression (5), the following development equation is obtained.

$$i\frac{\partial u}{\partial z} = (1/2)\beta_2(z)\frac{\partial^2 u}{\partial T^2} - \gamma(z)A(z)|u|^2 u \tag{9}$$

Here, the following transformation is performed:

$$\zeta = \int_0^z |\beta_2(z)|dz \tag{10}$$

As a result, the expression (9) can be transformed into the following manner:

$$i\frac{\partial u}{\partial \zeta} = \frac{\text{sgn}[\beta_2]}{2}\frac{\partial^2 u}{\partial T^2} - \frac{\gamma(\zeta)A(\zeta)^2}{|\beta_2(\zeta)|}|u|^2 u \tag{11}$$

where sgn[β₂]≡±1 assumes +1 when β₂>0, that is, when the dispersion is normal dispersion, but assumes −1 when β₂<0, that is, when the dispersion is anomalous dispersion. If the expression (11) stands, then also a complex conjugate with it stands, and the following expression is obtained.

$$-i\frac{\partial u^*}{\partial \zeta} = \frac{\text{sgn}[\beta_2]}{2}\frac{\partial^2 u^*}{\partial T^2} - \frac{\gamma(\zeta)A(\zeta)^2}{|\beta_2(\zeta)|}|u^*|^2 u^* \tag{12}$$

Complex conjugate light u* behaves in accordance with a development equation same as the development equation for u. However, the propagation direction then is opposite. This operation precisely is operation of a phase conjugator. Particularly in a phase conjugator of the transmission type, the above operation is equivalent to inversion of a phase shift by chromatic dispersion and SPM.

Here, in FIG. 2, it is assumed that the length of the first optical fiber 4 is L₁ and the length of the first portion 81 of the second optical fiber 8 is L₂. Further, the first phase conjugator 6 is disposed at the origin z=0 (ζ=0) of the z coordinate and the ζ coordinate. The z coordinate and the ζ coordinate of the system midpoint 16 are L₂ and ζ₀, respectively.

In the first optical fiber 4, a signal beam u (Es) propagates in accordance with the development equation (11). The signal beam u is converted into a phase conjugate beam u* (Ec) by the first phase conjugator 6. The phase conjugate beam u* propagates in accordance with the development equation (12) in the first portion 81 of the second optical fiber 8. In this instance, if the values of the parameters are set so that the coefficients of the first and second terms of the right side of the expression (11) are equal within a normalized distance dζ for two arbitrary points −ζ and ζ located at symmetrical positions on the ζ axis with respect to the position (ζ=0) of the first phase conjugator 6, then u* at −ζ becomes a phase conjugate wave of u at ζ. In particular, the following two expressions become requirements.

$$\text{sgn}[\beta_2(-\zeta)]=\text{sgn}[\beta_2(\zeta)] \tag{13}$$

$$\frac{\gamma(-\zeta)A(-\zeta)^2}{|\beta_2(-\zeta)|} = \frac{\gamma(\zeta)A(\zeta)^2}{|\beta_2(\zeta)|} \tag{14}$$

The expression (13) indicates the necessity that the signs of the dispersions of the first optical fiber 4 and the first portion 81 be equal to each other. If it is taken into consideration that γ>0 and A(z)²>0 in a fiber, then the requirements given above can be gathered in the following manner.

$$\frac{\gamma(-\zeta)A(-\zeta)^2}{\beta_2(-\zeta)} = \frac{\gamma(\zeta)A(\zeta)^2}{\beta_2(\zeta)} \tag{15}$$

The phase shift by the chromatic dispersion and the SPM at (−ζ) in the first optical fiber 4 is inverted in sign by the first phase conjugator 6. Accordingly, waveform distortion by the phase shift is compensated for by distortion by the phase shift at (ζ) in the first portion 81. If compensation by such setting as described above is repeated for each interval in this manner, then compensation over the overall length is possible.

Next, the compensation requirement described above is described in connection with the z coordinate. From the expression (15), $$\frac{\gamma(-z_1)A(-z_1)^2}{\beta_2(-z_1)} = \frac{\gamma(z_2)A(z_2)^2}{\beta_2(z_2)} \quad (16)$$

is obtained. In particular, to make the ratios of the chromatic dispersions to products of the nonlinear coefficients and the optical powers in the individual intervals equal to each other becomes a requirement. Here, $-z_1$ and $z_2$ represent two points which satisfy the following expression.

$$\int_0^{-zI} |\beta_2(z)|\,dz = \int_0^{z2} |\beta_2(z)|\,dz \quad (17)$$

From the expressions (16) and (17), expressions (18) and (19) are obtained:

$$\beta_2(-z_1)dz_1 = \beta_2(z_2)dz_2 \quad (18)$$

$$\gamma(-z_1)A(-z_1)^2 dz_1 = \gamma(z_2)A(z_2)^2 dz_2 \quad (19)$$

where $dz_1$ and $dz_2$ are lengths of small intervals at $-z1$ and $z2$, respectively, and each interval length increases in inverse proportion to the dispersion in the interval or in inverse proportion to the product of the nonlinear coefficient and the optical power. Here, if the relationship between the dispersion $\beta_2$ and the dispersion parameter D, that is, $D = -(2\pi c/\lambda^2)\beta_2$, is taken into consideration, then a relationship given below is obtained from the expressions (18) and (19). D is a function of z and is represented also as $D(z)$.

$$D(-z_1)dz_1 = D(z_2)dz_2 \quad (20)$$

$$\gamma(-z_1)P(-z_1)dz_1 = \gamma(z_2)P(z_2)dz_2 \quad (21)$$

It can be seen that it is a requirement for compensation for both of the dispersion and the nonlinearity that an increment at one of two positions symmetrical with respect to the first phase conjugator 6 be equal to a decrement at the other of the two positions.

The expressions (20) and (21) are requirements for compensation and indicate that the total dispersion amounts and the total amounts of the Kerr effect in two intervals corresponding to each other are equal to each other. Thus, the effectiveness of the conditions of the expressions (1) to (4) are confirmed.

Particularly where $\alpha$, D and $\gamma$ are substantially fixed and the variation of the power is small, by integrating the expressions (20) and (21), $$D_1 L_1 = D_2 L_2 \quad (22)$$

$$\gamma_1 \overline{P}_1 L_1 = \gamma_2 \overline{P}_2 L_2 \quad (23)$$

are obtained. Here, $\overline{P}_1$ and $\overline{P}_2$ are average powers in the first optical fiber 4 and the first portion 81, respectively. Further, $D_1$ and $\gamma_1$ are the dispersion parameter and the nonlinear coefficient of the first optical fiber 4 or average values of them, respectively, and $D_2$ and $\gamma_2$ are the dispersion parameter and the nonlinear coefficient of the first portion 81 or average values of them, respectively. The expressions (22) and (23) coincide with requirements in an SPM compensation method by dispersion compensation and average value approximation.

In practical use, the present invention can be worked only if the requirement of the expression (22) is satisfied. For example, the system of FIG. 1 may be constructed such that the product of the average value of the chromatic dispersion and the length of the first optical fiber 4 is substantially equal to the product of the average value of the chromatic dispersion and the length of the first portion 81 of the second optical fiber 8 and the product of the average value of the chromatic dispersion and the length of the second portion 82 of the second optical fiber 8 is substantially equal to the product of the average value of the chromatic dispersion and the length of the third optical fiber 12. By this setting, the wavelength distortion by the chromatic dispersion is compensated for.

Preferably, in order to further satisfy the requirement of the expression (23), the product of the average value of the optical power, the average value of the nonlinear coefficient, and the length of the first optical fiber 4 is made substantially equal to the product of the average value of the optical power, the average value of the nonlinear coefficient, and the length of the second portion 81, and the product of the average value of the optical power, the average value of the nonlinear coefficient, and the length of the second portion 82 is made substantially equal to the product of the average value of the optical power, the average value of the nonlinear coefficient, and the length of the third optical fiber 12. By this setting, in addition to the waveform distortion by the chromatic dispersion, also the waveform distortion by the nonlinearity is compensated for.

Where a plurality of optical amplifiers are provided on the optical path which includes the first, second and third optical fibers 4, 8 and 12, preferably the distance between each adjacent ones of the optical amplifiers is set shorter than the nonlinear length of the optical path (optical fiber). The nonlinear length is hereinafter described.

In FIG. 2, a principle of compensation on the upstream side of the system midpoint 16 is illustrated. Since the principle of compensation on the downstream side of the system midpoint 16 can be recognized similarly, description of it is omitted herein.

In the description with reference to FIG. 2, as seen from the expression (10), a normalized coordinate is defined by an accumulated value of chromatic dispersion from the phase conjugator 6. As a result, it is a required condition that the ratios between the products of the optical powers and the nonlinear coefficients and the chromatic dispersions at two points on the first optical fiber 4 and the first portion 81 at which the accumulated values of the chromatic dispersions from the first phase conjugator 6 are equal to each other.

In FIG. 2, a normalized coordinate may be defined by an accumulated value of the nonlinear effect from the first phase conjugator 6 (that is, an accumulated value of the products of the optical powers and the nonlinear coefficients). In this instance, it is a requirement that the ratios between the chromatic dispersions and the products of the optical powers and the nonlinear coefficients at two points on the first optical fiber 4 and the first portion 81 at which the accumulated values from the first phase conjugator 6 are equal to each other be substantially equal to each other.

In the following, a result of an experiment conducted to demonstrate the effectiveness of the principle of FIG. 2 is described.

Figure 3:
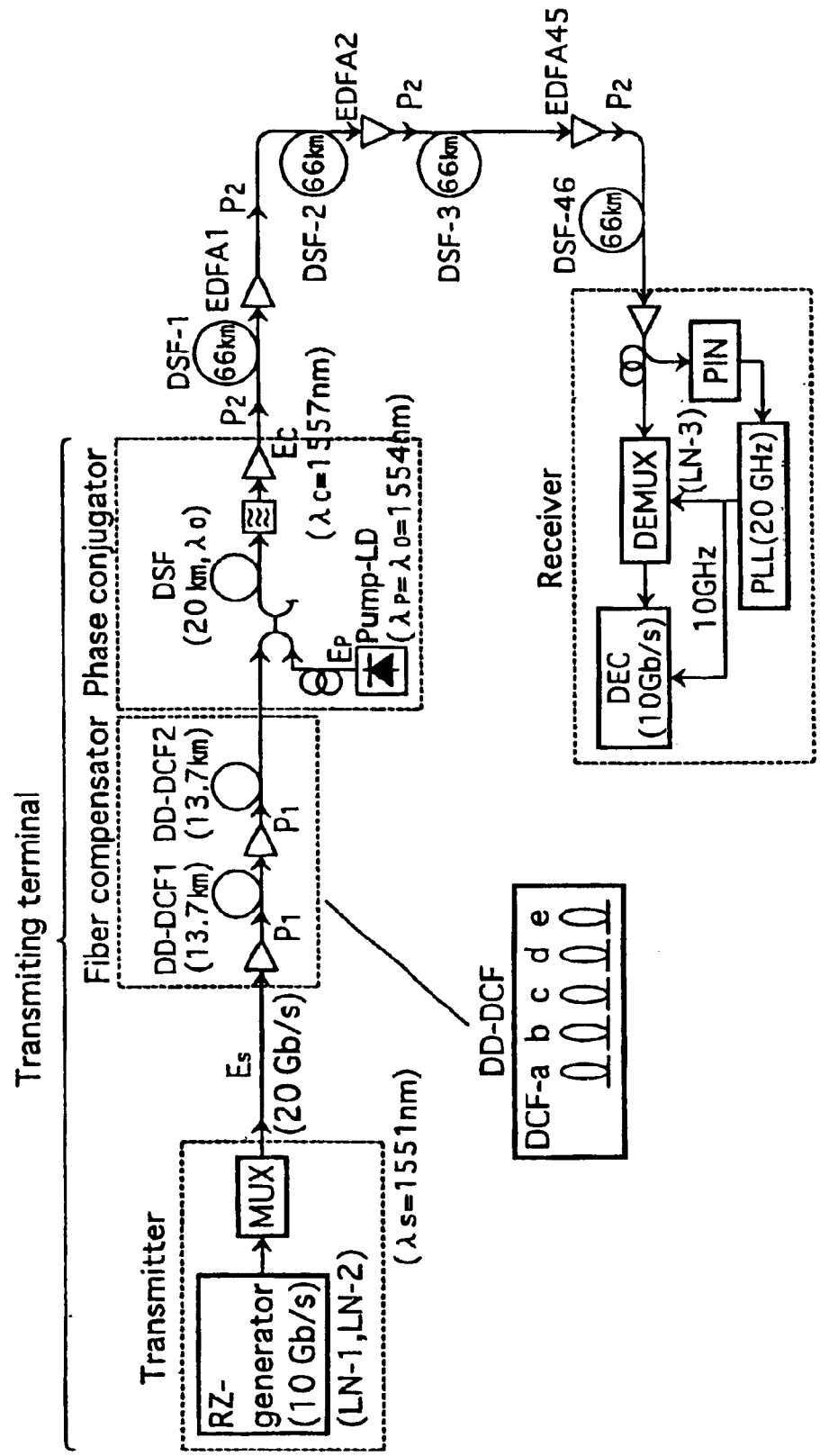
FIG. 3 is a block diagram of a system which was used in a demonstration experiment.

Referring to FIG. 3, there is shown a block diagram of a system used in the demonstrating experiment.

A transmitter (Transmitter) corresponds to the optical transmitter 2 of FIG. 1; a fiber compensator (Fiber compensator) corresponds to the first optical fiber 4 of FIG. 1; a phase conjugator (Phase conjugator) corresponds to the first phase conjugator 6 of FIG. 1; and dispersion shifted fibers (DSF-1, 2, . . . , 46) and erbium-doped fiber amplifiers (EDFA1, 2, . . . , 45) correspond to the first portion 81 of the second optical fiber 8 of FIG. 1. A receiver (Receiver) for measuring a transmission characteristic is provided at the system midpoint 16 of FIG. 1.

For a light source of the transmitter, two DFB-LDs (distributed feedback type laser diodes) of the 3-electrodes $\lambda/4$ shift type were used. Time division multiplexed signal light Es (wavelength $\lambda s=1,551$ nm) of 20 Gb/s was produced by time division multiplexing RZ signals of 2 channels of 10 Gb/s having a pulse width (FWHM) of approximately 40 ps. In order to produce RZ pulses of 10-Gb/s, Es was intensity modulated with a sine wave of 10 GHz using a first $LiNbO_3$ modulator (LN-1) and then intensity modulated with an NRZ data signal (PN: $2^{23}-1$) of 10 Gb/s using a second $LiNbO_3$ modulator (LN-2). The modulated Es was inputted to DD-DCF1 and DD-DCF2 of two stages so that the waveform was compensated for in advance.

Here, the "DD-DCF" represents a dispersion compensating fiber of the dispersion gradually decreasing type (dispersion-decreasing dispersion-compensating fiber: DD-DCF).

Each of the DD-DCFs is formed from five DCFs (DCF-a, b, c, d and e) spliced to each other. The loss of each of the DD-DCFs was 0.46 dB/km, and the mode field diameter of each of the DCFs was set to approximately 4 $\mu$m.

In order to approximately satisfy the requirement of the expression (16), the dispersion parameter $D_1$ should decrease in accordance with a decrease of the average optical power in each of the DD-DCFs. To this end, the length and $D_1$ of each of the five DCFs was set in such a manner as seen in Table below:

TABLE

| DCF | Length (km) | $D_1$ (ps/nm/km) |
|---|---|---|
| a | 2.8 | −80.6 |
| b | 2.7 | −57.9 |
| c | 2.8 | −43.7 |
| d | 2.7 | −32.1 |
| e | 2.7 | −27.0 |

The length of each of the DD-DCFs was 13.7 km, and the total dispersion of each of the DD-DCFs was −662.8 ps/nm.

It is to be noted that, in order to set the power of light to be inputted to each of the DD-DCFs to $P_1$, two optical amplifiers were connected in cascade connection.

Then, the phase conjugator converted Es compensated for in advance (provided with distortion) into phase conjugate light Ec (wavelength $\lambda c=1,557$ nm), which propagated in the same direction as Es, by forward FWM (four wave mixing) of the non-degeneration type using pump light Ep of a wavelength $\lambda p=1,554$ nm in a DSF of 20 km. The conversion efficiency from Es to Ec was −12 dB.

Then, the phase conjugate light Ec was supplied to a transmission line of 3,036 km formed from 46 DSFs (0.21 dB/km in loss) connected in cascade connection and 45 EDFAs (each having a noise figure of approximately 6 dB) interposed between the DSFs. The average dispersion at $\lambda c$ of this transmission line was −0.44 ps/nm/km. Accordingly, the difference between the total dispersion of the DD-DCFs of the two stages and the total dispersion of the transmission line was approximately 10 ps/m. The length of each of the DSFs was 66 km, and the optical input power $P_2$ to each DSF was set to +6 dBm.

The optimum value of $P_1$ was, in the conditions described above, +16 dBm. The nonlinear coefficient $\gamma_1$ of the DD-DCFs was estimated to be approximately 18.0 $W^{-1}$ $km^{-1}$.

In order to suppress stimulated brillouin scattering (SBS), Es and Ep were frequency modulated with sine wave signals of 500 kHz and 150 kHz, respectively. In the receiver, a third $LiNbO_3$ modulator (LN-3) and a phase-locked loop (PLL) were used to time division demultiplex Ec and measure the bit error rate (BER).

For comparison, also a transmission experiment over 1,518 km using one DD-DCF and 23 DSFs was conducted.

Figure 4:
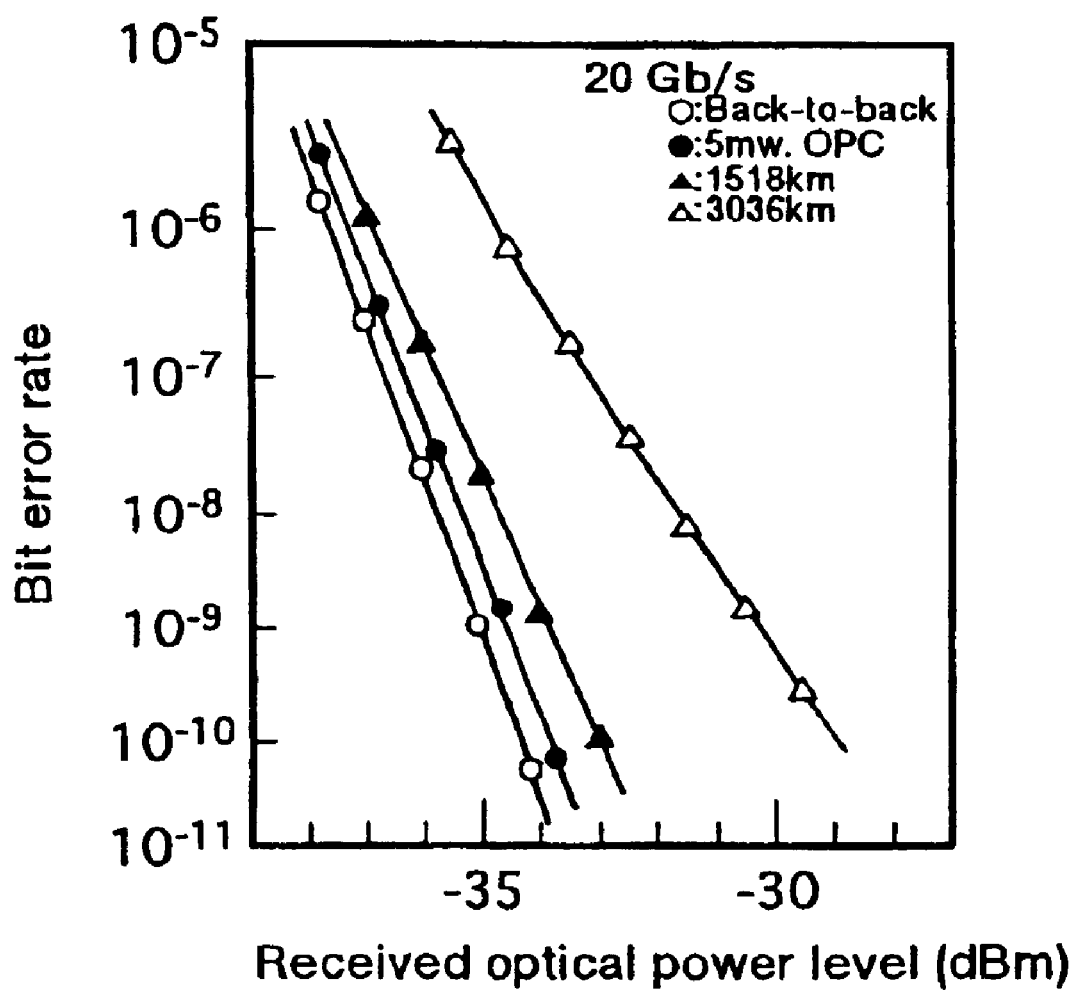
FIG. 4 is a diagram illustrating a BER (bit error rate) characteristic.

A characteristic of the BER measured is illustrated in FIG. 4. Even after the transmission of 3,036 km, the signal was detected successfully with a BER lower than $10^{-9}$. The power penalty of 4.8 dB in the BER of $10^{-9}$ originated from S/N deterioration from a theoretical value by noise of the EDFA and so forth. In the experiment, $\lambda c$ detuned by approximately 1.5 nm from the wavelength $\lambda G \approx 1,558.5$ nm with which a gain peak is exhibited for each EDFA. If it is possible to make $\lambda c$ coincide with $\lambda G$, then a higher S/N characteristic can be obtained. In the transmission experiment of 1,518 km, the penalty was approximately 1.2 dB.

Figure 5A:
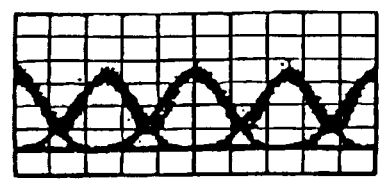
FIGS. 5A to 5E are diagrams illustrating a variation in waveform of the system of FIG. 3.
Figure 5B:
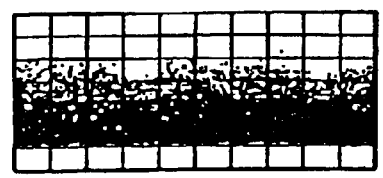
Figure 5C:
Figure 5D:
Figure 5E:
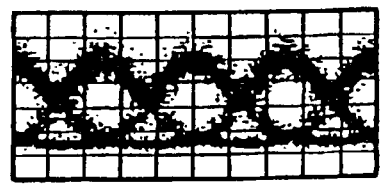

FIGS. 5A to 5E illustrate a manner of variation of the waveform detected in a 3,036 km transmission experiment. FIG. 5A shows an output waveform of the transmitter; FIG. 5B shows an output waveform of the phase conjugator; FIG. 5C shows a waveform after transmission over 1,518 km; FIG. 5D shows a waveform after transmission over 2,706 km; and FIG. 5E shows a waveform after transmission over 3,036 km. It can be seen that a waveform distorted in advance is gradually improved as Ec propagates. The residue of waveform distortion in FIG. 5E originated from an incomplete compensation condition. In particular, in the demonstration experiment, due to the fact that the distance between the EDFAs (the length of each DSF: 66 km) was not sufficiently shorter than the nonlinear length defined by a reciprocal number to the product of the nonlinear coefficient and the optical power, the improvement in waveform was not complete.

Accordingly, in the present invention, where a plurality of optical amplifiers are used, it is preferable to set the distance between them shorter than the nonlinear length.

Further, the compensation can be further improved by setting the dividing number of DCFs in a DD-DCF larger than 5 used in the experiment.

For each of the optical fibers 4, 8 and 12 of FIG. 1, a single mode silica fiber can be used. Silica fibers for use with optical fiber communication may be 1.3 $\mu$m zero dispersion fibers, 1.55 $\mu$m dispersion shifted fibers and so forth.

For a modulation method for signal light by the optical transmitter 2, optical amplitude (intensity) modulation, frequency modulation, phase modulation or any other available modulation method can be used. Further, for signal detection by the optical receiver 14, optical direct detection after filtering by an optical band filter or optical heterodyne detection can be used.

Each of the phase conjugators 6 and 10 has a second- or third-order nonlinear optical medium and means for pumping the medium. Where a second-order nonlinear optical medium is used, phase conjugate conversion is performed by a parametric effect, but where a third-order nonlinear optical medium is used, phase conjugate conversion is performed by four wave mixing of the degeneration type or the non-degeneration type.

For a third-order nonlinear optical medium, for example, a silica fiber can be used. In this instance, good phase conjugate conversion can be achieved by making the wavelength of pump light for four wave mixing substantially coincident with the zero dispersion wavelength of the silica fiber. A phase conjugator which uses a silica fiber is superior in high speed, broad band, low distortion and consistency with a transmission line.

For a third-order nonlinear optical medium, also a semiconductor optical amplifier (SOA) may be used. A phase conjugator which employs an SOA is superior in broad band and miniaturization.

For a third-order nonlinear optical medium, a laser diode of the distribution feedback type (DFB-LD) itself may be used. By injection of current, the DFB-LD produces pump light, and phase conjugate conversion is performed by four wave mixing. Accordingly, an external pump light source is not required. A phase conjugator which employs a DFB-LD is superior in broad band and miniaturization. For details of a phase conjugator which employs a DFB-LD, a document (H. Kuwatsuka, H. Shoji, M. Matsuda and H. Ishikawa, "THz frequency conversion using nondegenerate four-wave mixing process in a lasing long-cavity λ/4-shifted DFB laser" Electron. Lett., vol. 31, pp. 2,108–2,110, 1995) should be referred to.

For a second-order nonlinear optical medium, an optical waveguide made of $LiNbO_3$, AlGaAs or the like can be used. A phase conjugator which employs this optical waveguide allows good phase consistency by adoption of a pseudo phase matching structure and is superior in broad band, and extraction of a phase conjugate beam therefrom is easy. For this, for example, a document (C. Q. Xu, H. Okayama and M. Kawahara, "1.5 μm band efficient broadband wavelength conversion by difference frequency generation in a periodically domain-inverted LiNbO3 channel waveguide" Appl. Phys. Lett., vol. 63, No. 26, pp. 3,559–3,561, 1993) should be referred to.

Figure 6:
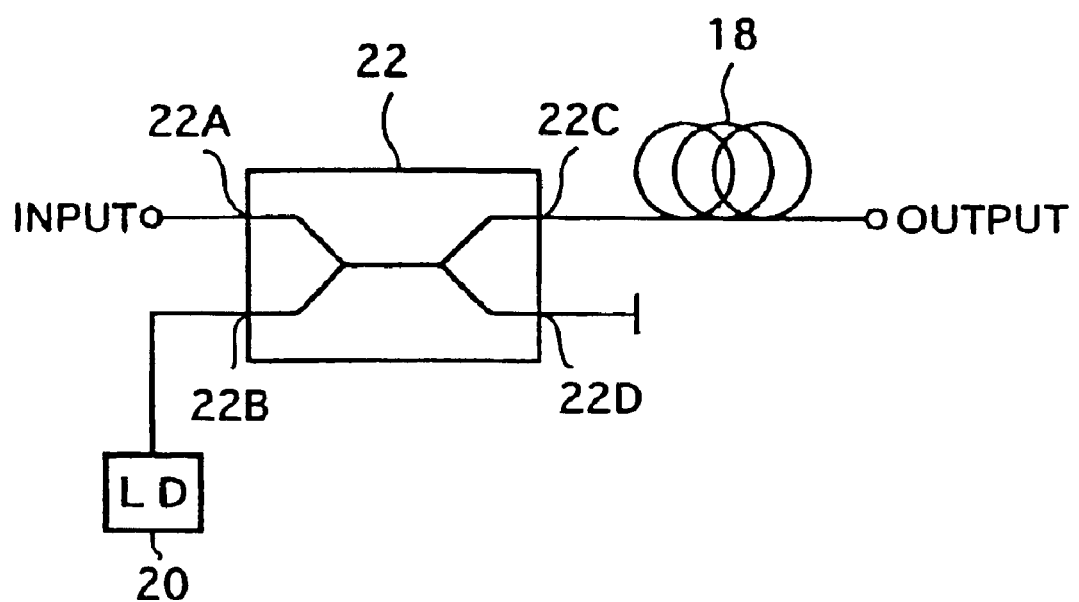
FIG. 6 is a block diagram showing a construction example of a phase conjugator which can be applied to the present invention.

Referring to FIG. 6, there is shown a phase conjugator which can be used for each of the phase conjugators 6 and 10 of FIG. 1. This phase conjugator includes an optical fiber 18 serving as a third-order nonlinear optical medium, a laser diode (LD) 20 serving as a pump light source, and an optical coupler 22 for adding an input beam and pump light to each other and supplying the resulting beam to the optical fiber 18.

Preferably, the optical fiber 18 is a single mode fiber. In this instance, where it is intended to make the wavelength of the input beam and the wavelength of the pump light a little different from each other so as to cause four wave mixing of the nondegeneration type to occur, the zero-dispersion wavelength of the optical fiber 18 is set equal to the wavelength of the pump light (oscillation frequency of the LD 20). The optical coupler 22 has four ports 22A, 22B, 22C and 22D. An input beam (signal beam or first phase conjugate beam) is supplied to the port 22A, and the port 22B is connected to the LD 20. Further, the port 22C is connected to a first end of the optical fiber 18, and the port 22D is made a dead end. A second end of the optical fiber 18 serves as an output port of the phase conjugator. The optical coupler 22 outputs an input beam and pump light supplied to the ports 22A and 22B thereof, respectively, from the port 22C thereof. For the optical coupler 22, for example, an optical coupler of the fiber fusion type, a half mirror, an optical wave combiner, a polarizing beam splitter or the like is used.

Figure 7:
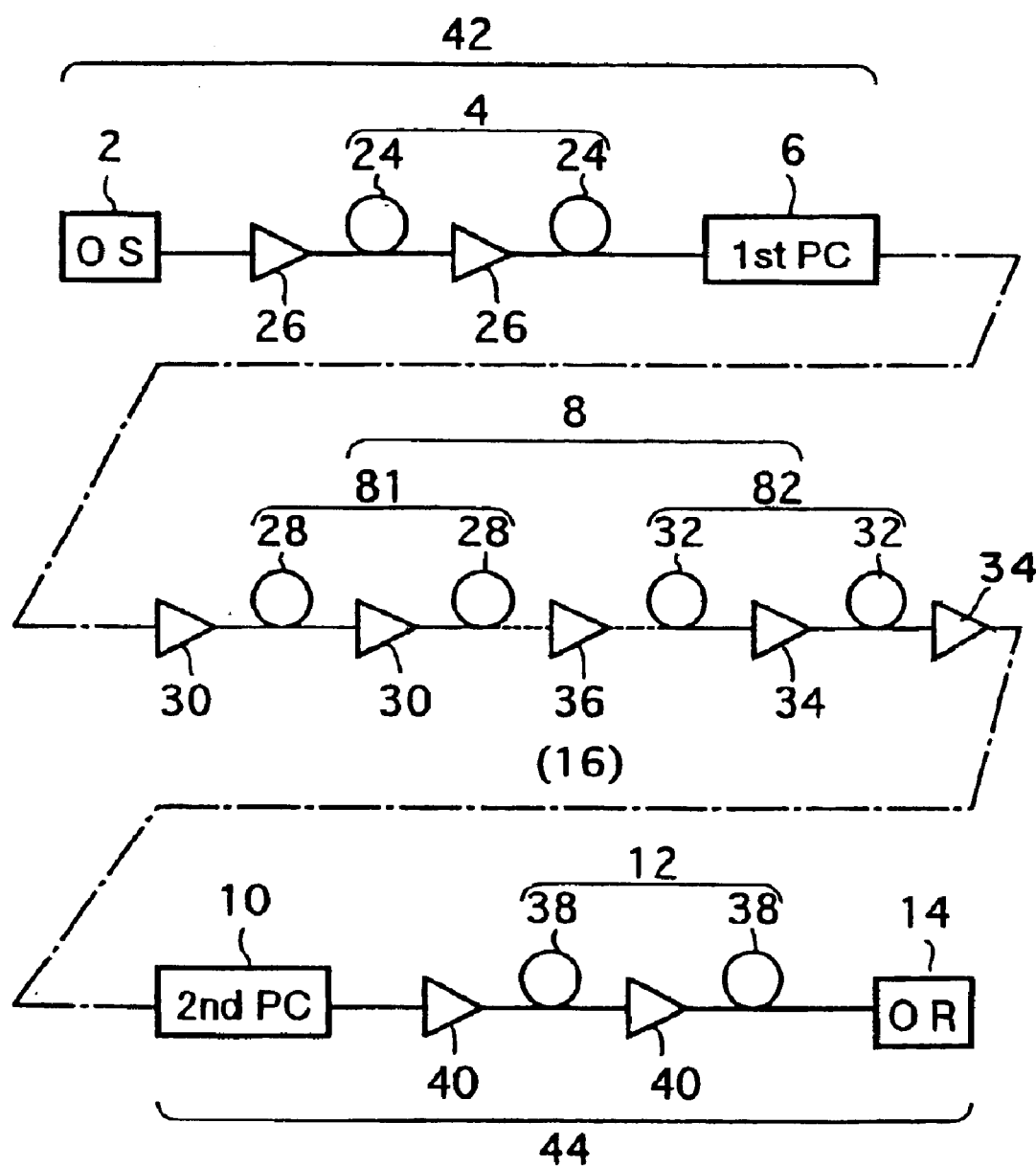
FIG. 7 is a block diagram showing a first embodiment of an optical communication system of the present invention.

Referring to FIG. 7, there is shown a first embodiment of the present invention. For the first optical fiber 4, two such DD-DCFs 24 as were used in the demonstration test are adopted. An optical amplifier 26 is provided on the input side of each of the DD-DCFs 24 so that the power of a signal beam to be supplied to each DD-DCF 24 may have a predetermined level. The first portion 81 of the second optical fiber 8 is formed from a plurality of optical fibers 28 connected in cascade connection. Between each adjacent ones of the optical fibers 28, an optical amplifier 30 is provided in order to keep the optical power in the first portion 81 substantially constant. The second portion 82 of the second optical fiber 8 is formed from a plurality of optical fibers 32. Between each adjacent ones of the optical fibers 32, an optical amplifier 34 is provided in order to keep the optical power in the second portion 82 substantially constant.

Particularly in the present embodiment, at the system midpoint 16, an optical amplifier 36 by which removal of noise is performed effectively is provided. For the third optical fiber 12, two such DD-DCFs 38 as are same as those used in the demonstration experiment are adopted. On the input side of each of the DD-DCFs 38, an optical amplifier 40 is provided in order that the power of a second phase conjugate beam to be supplied to each DD-DCF 38 may have a level determined in advance.

The optical transmitter 2, first optical fiber 4 and first phase conjugator 6 are included in a first terminal station 42, and the second phase conjugator 10, third optical fiber 12 and optical receiver 14 are included in a second terminal station 44. The terminal stations 42 and 44 are installed, for example, on different continents from each other, and in this instance, the second optical fiber 8 can be laid as a transmission line on the bottom of the sea between the continents.

Figure 8:
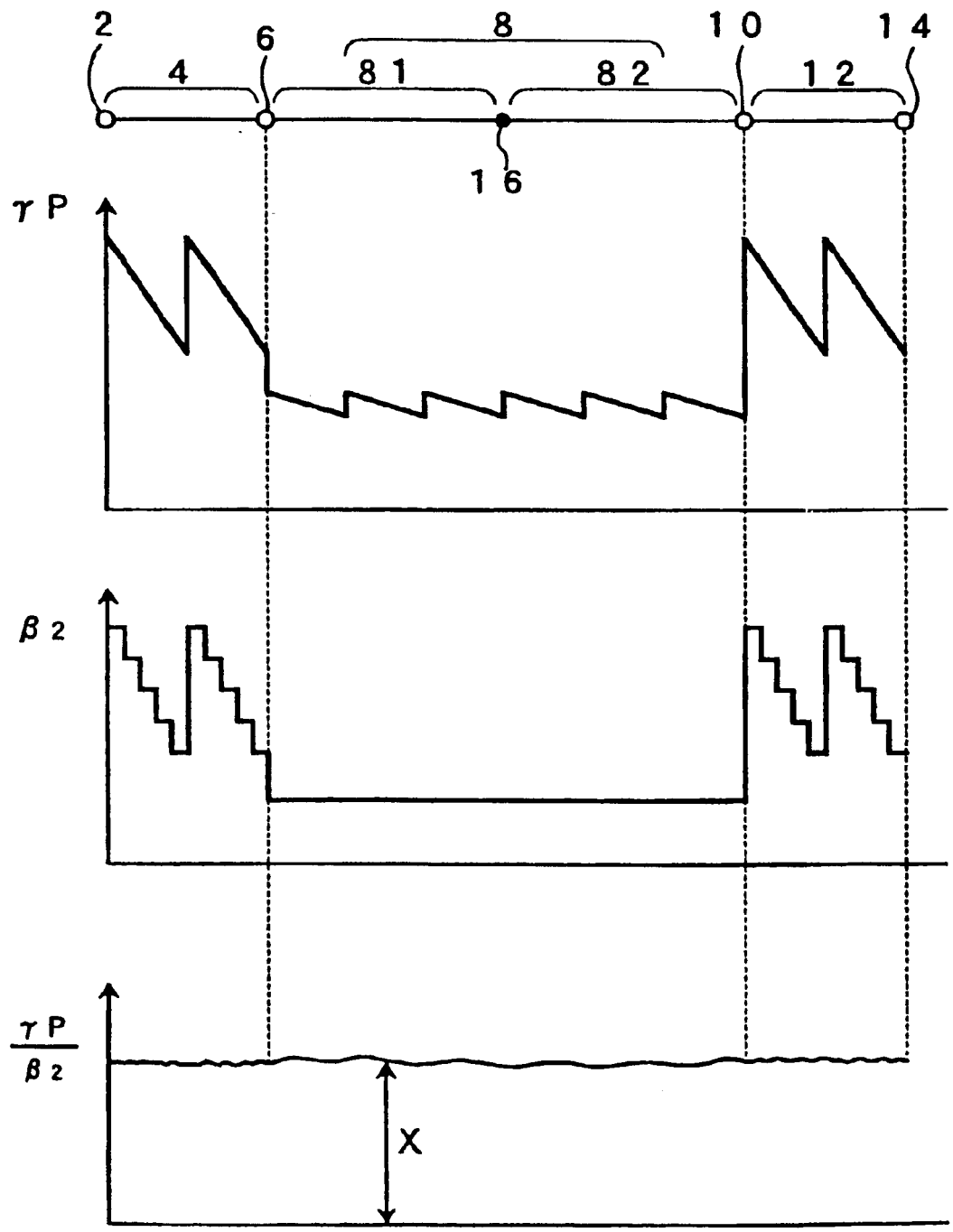
FIG. 8 is a diagram of an optical power and so forth of the system of FIG. 7.

Referring to FIG. 8, there is shown a diagram of optical powers and so forth in the system of FIG. 7. In each of the two DD-DCFs 24 which form the first optical fiber 4, the chromatic dispersion $\beta_2$ gradually decreases as the nonlinear effect (product of the nonlinear coefficient γ and the optical power P) decreases, and consequently, the ratio ($\gamma P/\beta_2$) between the nonlinear effect and the chromatic dispersion is substantially fixed.

Further, intermediately of the second optical fiber 8, a plurality of optical amplifiers 30, 34 and 36 for making the optical power in the second optical fiber 8 substantially constant are provided. Accordingly, according to the present embodiment, existing optical fiber transmission lines whose parameters are not designed specifically can be used or combined to form the second optical fiber 8. Details are described below.

Now, it is assumed that, as the first portion 81 of the second optical fiber 8, an existing transmission line composed of a plurality of optical fibers 28 and a plurality of optical amplifiers 30 as shown in FIG. 7 is provided. Since generally the average value of chromatic dispersion in an existing transmission line is fixed, the ratio ($\gamma P/\beta_2$) between the nonlinear effect and the chromatic dispersion in the first portion 81 of the second optical fiber 8 can be set to a value x given in advance by suitably setting the gain of each of the optical amplifiers 30. Once the ratio x is given with regard to the transmission line, the distribution of the product γP of the nonlinear coefficient and the optical power and the distribution of the chromatic dispersion $\beta_2$ in each of the DD-DCFs 24 are set. Then, the ratio ($\gamma P/\beta_2$) between the nonlinear effect and the chromatic dispersion of the first optical fiber 4 can thereby be made coincident with the ratio x regarding the first portion 81 of the second optical fiber 8. As a result, the waveform restores its original waveform at the system midpoint 16.

It is to be noted that, although the system here is designed so that the fixed ratio x may be obtained with regard to the overall length of the first optical fiber 4 and the first portion 81 of the second optical fiber 8, where, for example, the optical fibers 28 which form the first portion 81 have individually different chromatic dispersions $\beta_2$, since a plurality of intervals having different chromatic dispersions are produced in the first portion 81, the waveform can restore its original waveform at the system midpoint 16 by imaginarily dividing the first optical fiber 4 into a plurality of intervals and making the requirement described hereinabove be satisfied for each two corresponding intervals in accordance with the present invention.

The waveform can restore its original waveform also at the optical receiver 14 by designing the second portion 82 of the second optical fiber 8 and the third optical fiber 12 in a similar manner as described above. While, in the example of FIG. 8, the diagram is shown such that the first portion 81 and the second portion 82 of the second optical fiber 8 have chromatic dispersions of equal values, also where they have different chromatic dispersions, the waveform can restore its original waveform at the optical receiver 14 by suitably setting the gains of the optical amplifiers 40 and the construction of the DD-DCFs 38 in the second terminal station 44.

In this manner, with the present embodiment, by using the second optical fiber 8 as a transmission line, construction of a very long-haul transmission system wherein the chromatic dispersion and the nonlinearity are compensated for is allowed. Further, also a single phase conjugator which is provided intermediately of the transmission line is not required by providing the phase conjugators 6 and 10 in the terminal stations 42 and 44, respectively, the maintenance feasibility of the system is improved. In particular, while, taking it into consideration that maintenance of a transmission line laid on the bottom of the sea once is very difficult, there is a demand that a phase conjugator which generally has a complicated construction be not provided intermediately of a transmission line, the present invention satisfies such a demand.

It is to be noted that, in the system of FIG. 7, in order to achieve improvement of the waveform at the system midpoint 16, it is desirable to make the distance between the optical amplifiers 30 sufficiently shorter than the nonlinear length given as a reciprocal number to the product of the nonlinear coefficient and the optical power. Similarly, in order to achieve improvement of the waveform at the optical receiver 14, it is desirable to make the distance between the optical amplifiers 34 sufficiently shorter than the nonlinear length. In short, by making the distance between optical amplifiers sufficiently shorter than the nonlinear length, the optical power can be handled as being constant (average in power) over the overall length. In this instance, although the dispersion of the second optical fiber 8 is fixed, the condition that the ratio between the chromatic dispersion and the nonlinear effect is fixed before and after the phase conjugator approximately stands.

By the way, in the system of FIG. 7, since a plurality of optical amplifiers are used, noise is accumulated. For example, where each optical amplifier is an EDFA, noise by ASE (Amplified Spontaneous Emission) produced in EDFs (erbium-doped fibers) is accumulated.

In the present invention, as seen in FIG. 2, a signal spectrum gradually expands in the first optical fiber 4, and then the signal spectrum is reversed once on the frequency axis by the first phase conjugator 6, whereafter the signal spectrum gradually narrows in the first portion 81 of the second optical fiber and becomes narrowest at the system midpoint 16. Accordingly, in the present invention, noise by ASE can be removed effectively at the system midpoint 16.

Figure 9:
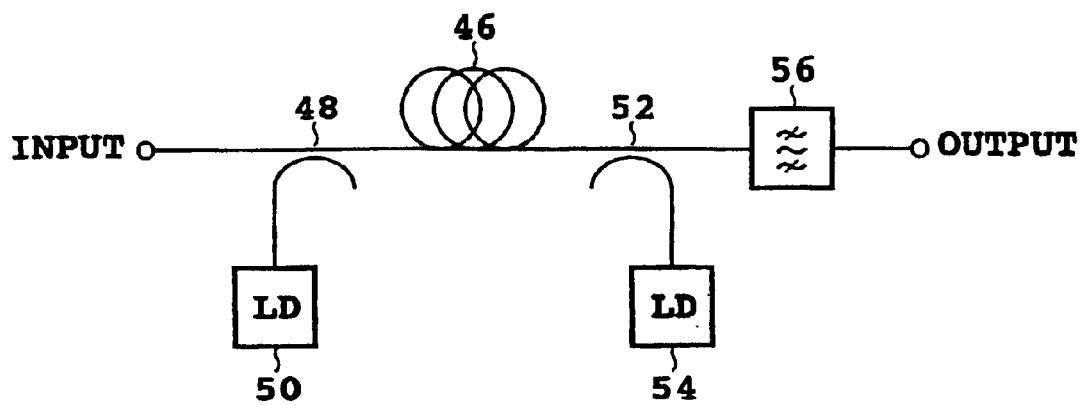
FIG. 9 is a block diagram of an optical amplifier which can be applied to the present invention.

Referring to FIG. 9, there is shown an optical amplifier which can be applied to the system of the present invention. To a first end of an EDF 46 serving as an optical amplification medium, a beam to be amplified and a first pump beam from a laser diode 50 are supplied through an optical coupler 48. To a second end of the EDF 46, a second pump beam from a laser diode 54 is supplied through an optical coupler 52. When the beam to be amplified is supplied to the EDF 46 which is pumped by the first and second pump beams, the beam is amplified by and outputted from the amplifier through the optical coupler 52 and an optical band-pass filter 56. Since ASE generated in the EDF 46 has a sufficiently broader band than the amplified beam, most of the ASE can be removed by the optical band-pass filter 56 to suppress a drop of S/N of the amplified beam.

Where, for example, such an optical amplifier as shown in FIG. 9 is applied to the optical amplifier 36 provided at the system midpoint 16 in the system of FIG. 7, since the signal spectrum is narrowest at the system midpoint 16, accumulated noise by ASE can be removed efficiently by using an optical band-pass filter which has a pass-band a little broader than the band-width of the signal spectrum as the filter 56.

It is to be noted that, while, in the optical amplifier of FIG. 9, the two laser diodes 50 and 54 are used to pump the EDF 46, only one of the laser diodes may be used to pump the EDF 46.

In this manner, with the preferred embodiment of the present invention, deterioration in S/N can be prevented effectively by providing an optical band-pass filter having a pass-band including the wavelength of a first phase conjugate beam in the proximity of the system midpoint 16 of the second optical fiber 8.

Figure 10:
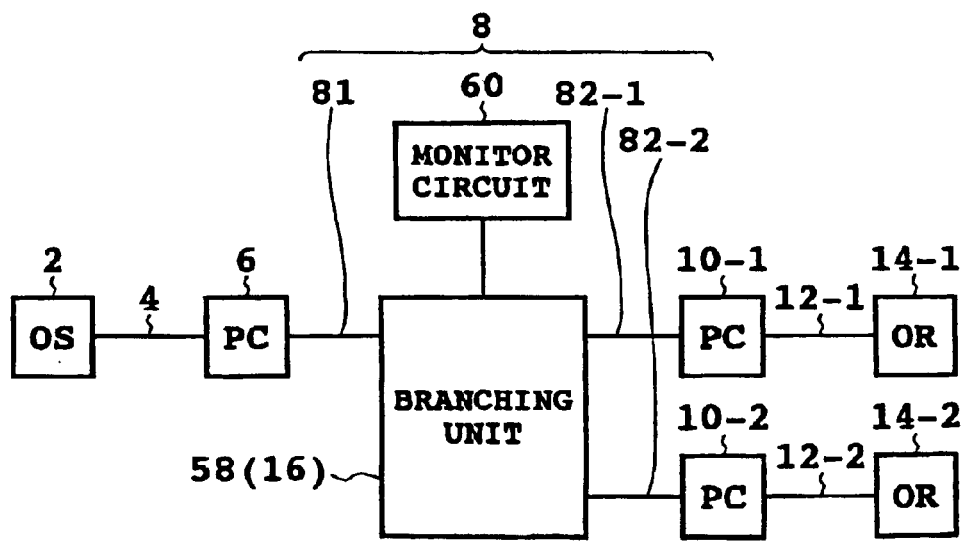
FIG. 10 is a block diagram showing a second embodiment of an optical communication system of the present invention.

Referring to FIG. 10, there is shown an optical communication system showing a second embodiment of the present invention. The present embodiment is characterized, in contrast with the basic construction of FIG. 1, in that a branching unit 58 is provided at the system midpoint 16 of the second optical fiber 8.

A signal beam outputted from the optical transmitter 2 is supplied to the first phase conjugator 6 by the first optical fiber 4. The first phase conjugator 6 converts the received signal beam into and outputs a phase conjugate beam. The phase conjugate beam outputted from the first phase conjugator 6 is supplied to the branching unit 58 by the first portion 81 of the second optical fiber 8. The branching unit 58 branches the received phase conjugate beam into first and second branch beams. The first and second branch beams are supplied to phase conjugators 10-1 and 10-2 through second portions 82-1 and 82-2 of the second optical fiber 8, respectively. The phase conjugator 10-1 converts the received first branch beam into a phase conjugate beam and sends the phase conjugate beam to an optical receiver 14-1 through an optical fiber (third optical fiber) 12-1. The phase conjugator 10-2 converts the received second branch beam into a phase conjugate beam and supplies the phase conjugate beam to an optical receiver 14-2 through an optical fiber (third optical fiber) 12-2.

Parameter setting of the optical fibers 4 and 81, parameter setting of the optical fibers 82-1 and 12-1, and parameter setting of the optical fibers 82-2 and 12-2 are performed in a similar manner as in those of FIG. 1 in accordance with the present invention.

Since the branching unit 58 is provided at the system midpoint 16, a transmission characteristic of a phase conjugate beam received can be monitored by the branching unit 58. To this end, a monitor circuit 60 is additionally provided for the branching unit 58. Though not shown, an optical receiver may be connected to the branching unit 58.

For example, the optical transmitter 2, first optical fiber 4 and first phase conjugator 6 are provided on a first continent; the phase conjugator 10-1, optical fiber 12-1 and optical receiver 14-1 are provided on a second continent; the phase conjugator 10-2, optical fiber 12-2 and optical receiver 14-2 are provided on a third continent; and the branching unit 58 and the monitor circuit 60 are provided on an island between the continents. The branching unit 58 may not be provided precisely at the system midpoint 16, and under the condition that the waveform is improved sufficiently, the branching unit 58 may be provided at a location spaced by a certain distance from the system midpoint 16.

While the second embodiment of the present invention is described here in contrast with the basic construction of FIG. 1, the first embodiment of FIG. 7 may be applied to the second embodiment of FIG. 10. Further, while, in FIG. 10, the branching unit 58 outputs first and second branch beams, a phase conjugate beam received by the branching unit 58 may be branched into three or more branch beams while phase conjugators and optical receivers corresponding to the branch beams are additionally provided on the downstream side of the branching unit 58.

Figure 11:
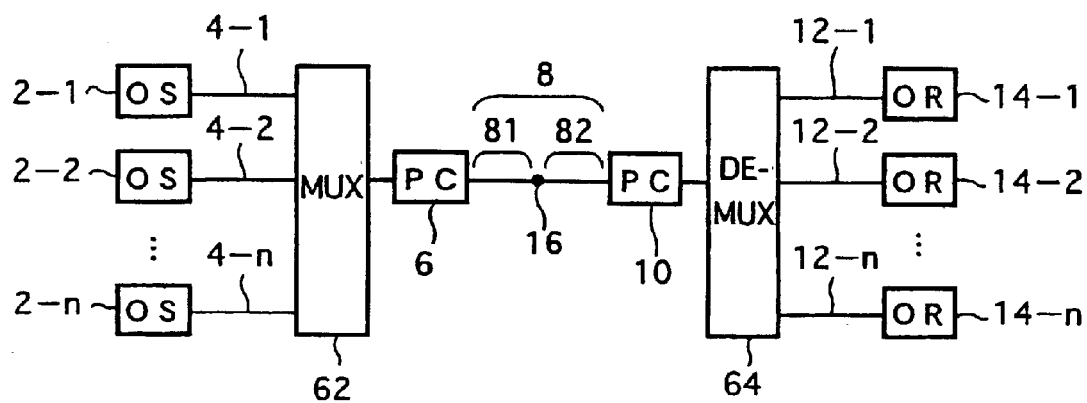
FIG. 11 is a block diagram showing a third embodiment of an optical communication system of the present invention.

Referring to FIG. 11, there is shown a third embodiment of the present invention. Here, in order to expand and apply the basic construction of FIG. 1 to WDM (wavelength division multiplex), an optical multiplexer (MUX) 62 and an optical demultiplexer (DE-MUX) 64 are used.

Optical transmitters 2-1, ..., n (n is an integer larger than 1) individually output signal beams having different wavelengths from each other. The signal beams are supplied to the optical multiplexer 62 through optical fibers 4-1, ..., n individually corresponding to the first optical fiber 4 of FIG. 1. The optical multiplexer 62 wavelength division multiplexes the received signal beams and outputs a WDM signal beam. Then, the WDM signal beam is supplied to the first phase conjugator 6. Here, since the optical fibers 4-1, ..., n for exclusive use are provided individually for the optical transmitters 2-1, ..., n, setting of parameters according to the present invention is possible for each wavelength channel. In other words, since the nonlinear coefficient and the chromatic dispersion are different among different wavelength channels, according to the present embodiment, precise compensation for each wavelength channel is possible.

The WDM signal beam after phase conjugate converted by the phase conjugator 6 is supplied through the second optical fiber 8 to the second phase conjugator. 10, by which it is further phase conjugate converted. The output beam of the second phase conjugator 10 is supplied to the optical demultiplexer 64. The optical demultiplexer 64 demultiplexes the received beam for the individual wavelength channels, and the beams of the channels are supplied to optical receivers 14-1, ..., n through optical fibers 12-1, ..., n, respectively, which correspond to the third optical fiber 12 of FIG. 1. Parameter setting of each of the optical fibers 4-1, ..., n and the first portion 81 of the second optical fiber 8 is performed in a similar manner as in the basic construction of FIG. 1, and also parameter setting of the second portion 82 of the second optical fiber 8 and each of the optical fibers 12-1, ..., n is performed in a similar manner as in that of FIG. 1.

While, in the present embodiment, the optical demultiplexer 64 is used in order to demultiplex a beam outputted from the second phase conjugator 10 into n channels, where a single optical receiver is used, the optical demultiplexer 64 is not necessary. In this instance, the optical receiver has optical or electric means for selecting a desired channel from among the n channels.

It is to be noted that, while the third embodiment is described in contrast with the basic construction of FIG. 1, the first embodiment of FIG. 7 may be applied to the third embodiment.

Figure 12:
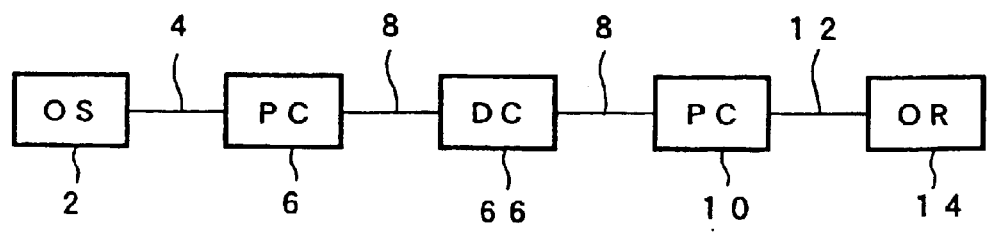
FIG. 12 is a block diagram showing a fourth embodiment of an optical communication system of the present invention.

Referring to FIG. 12, there is shown a fourth embodiment of the present invention. Here, in contrast with the basic construction of FIG. 1, at least one dispersion compensator (DC) 66 for providing chromatic dispersions of signs opposite to those of the chromatic dispersions of the optical fibers 4, 8 and 12 is provided additionally. While, in the example shown, the dispersion compensator 66 is provided intermediately of the optical fiber 8 between the phase conjugators 6 and 10, the dispersion compensator 66 may be connected to the input end or the output end of the optical fiber 8. Further, the dispersion compensator 66 may be provided intermediately of the optical fiber 4 or connected to the input end or the output end of the optical fiber 4 or may be provided intermediately of the optical fiber 12 or connected to the input end or the output end of the optical fiber 12.

For the dispersion compensator 66, a dispersion compensation fiber (DCF) having a chromatic dispersion of a high absolute value can be used. Whether the dispersion of each of the optical fibers 4, 8 and 12 is a normal dispersion or an anomalous dispersion, since the length can be suppressed short by using the dispersion compensator 66 formed from a DCF, the loss of the dispersion compensator 66 can be suppressed low. Particularly where each of the optical fibers 4, 8 and 12 has a normal dispersion, a 1.3 μm zero dispersion fiber is suitable for the dispersion compensator 66. For example, where a plurality of such dispersion compensators 66 are provided intermediately of the optical fiber 8, the dispersion compensators 66 are preferably provided at equal intervals in the longitudinal direction of the optical fiber 8.

While, in FIG. 12, the dispersion compensator 66 is added to the basic construction of FIG. 1, at least one dispersion compensator may be provided additionally in the first to third embodiments of the present invention.

Figure 13:
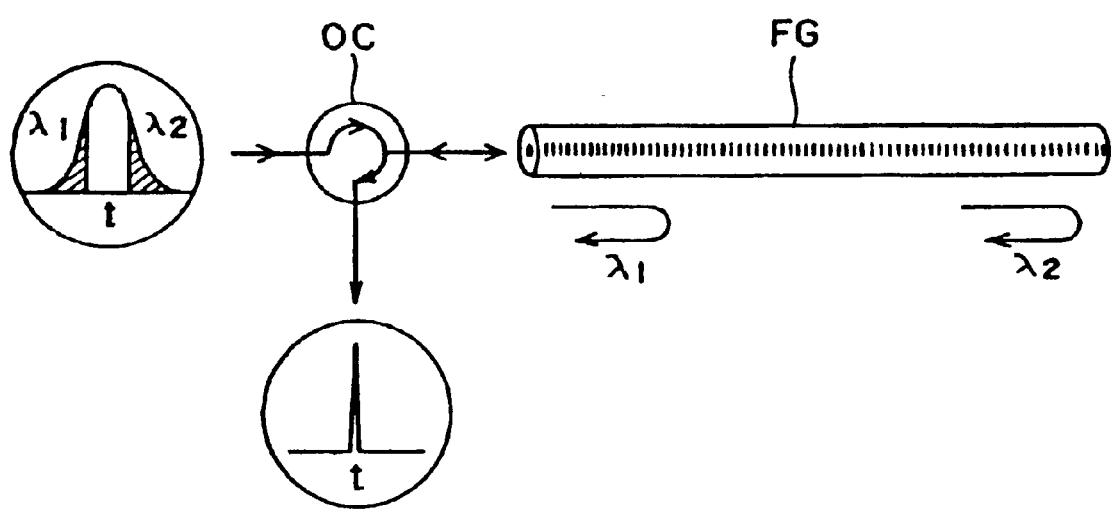
FIG. 13 is a diagrammatic view showing a dispersion compensator which uses a fiber grating.

Referring to FIG. 13, there is shown a construction of a dispersion compensator which uses a fiber grating FG. The dispersion compensator can be used as the dispersion compensator 66 of FIG. 12 or for an application which will be hereinafter described. Optical pulses whose wavelengths of both edges are $\lambda_1$ and $\lambda_2$ are supplied to the fiber grating FG through an optical circulator OC. The grating pitch of the fiber grating FG has a predetermined distribution, and the beam of the wavelength $\lambda_1$ is Bragg reflected at a position comparatively near to the optical circulator OC, but the beam of the wavelength $\lambda_2$ is Bragg reflected at another position comparatively far from the optical circulator OC. Consequently, compression of the optical pulses is performed, and dispersion compensation can be performed by extracting a Bragg reflected beam from the fiber grating FG through the optical circulator OC.

Figure 14:
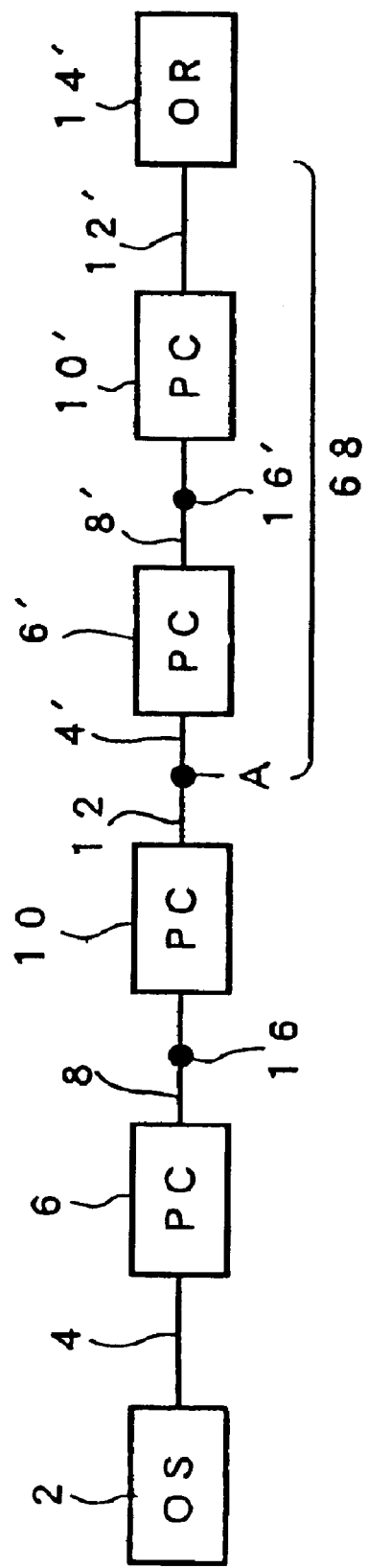
FIG. 14 is a block diagram showing a fifth embodiment of an optical communication system of the present invention.

Referring to FIG. 14, there is shown a fifth embodiment of the present invention. Here, a system is shown which further includes, in contrast with the basic construction of FIG. 1, an optical unit 68 which includes optical elements which individually correspond to the first optical fiber 4, first phase conjugator 6, second optical fiber 8, second phase conjugator 10 and third optical fiber 12. A first end of the optical unit 68 is connected to the third optical fiber 12 at a point A which corresponds to the optical receiver 14 of FIG. 1, and a second end of the optical unit 68 is connected to an optical receiver 14'. The optical unit 68 includes an optical fiber 4', a phase conjugator 6', an optical fiber 8', a phase conjugator 10' and an optical fiber 12' which correspond to the optical fiber 4, phase conjugator 6, optical fiber 8, phase conjugator 10 and optical fiber 12, respectively. The optical unit 68 has a system midpoint 16' which corresponds to the system midpoint 16 of FIG. 1. While, in the embodiment of FIG. 14, only one optical unit 68 is shown, a plurality of optical units 68 may be provided in series between the point A and the optical receiver 14'.

With the present embodiment, by applying the conditions of the present invention to individual portions of the system shown, the distance between the optical transmitter 2 and the optical receiver 14' can be increased sufficiently. Further, since the waveform of an optical signal restores its original waveform at the system midpoints 16 and 16' and the point A, adding/dropping of an optical signal or monitoring of an optical signal waveform can be performed readily by providing a node at each of the points. Further, by applying the optical band-pass filter 56 of the optical amplifier of FIG. 9 to at least one of the system midpoints 16 and 16' and the point A, noise by ASE can be removed efficiently.

It is to be noted that, while the fifth embodiment here is described in contrast with the basic construction of FIG. 1, the first embodiment of FIG. 7 may be applied to the fifth embodiment.

Figure 15:
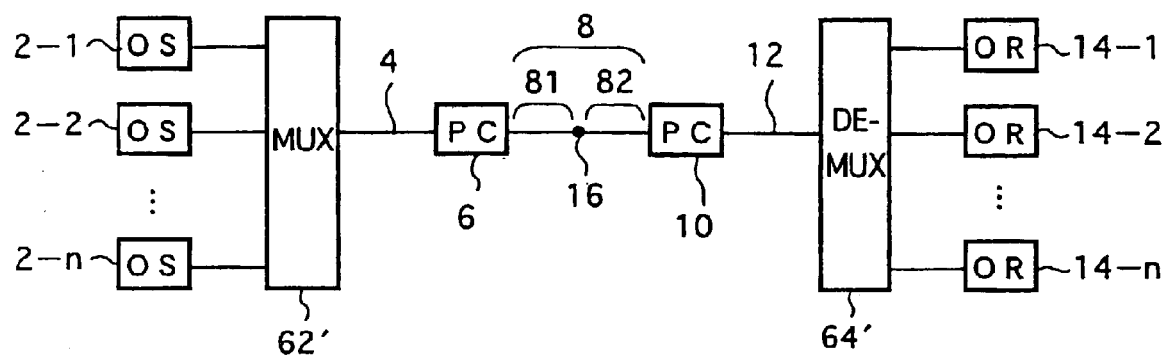
FIG. 15 is a block diagram showing a sixth embodiment of an optical communication system of the present invention.

Referring to FIG. 15, there is shown a sixth embodiment of the present invention. In the third embodiment of FIG. 11, in order to apply the basic construction of FIG. 1 to WDM (wavelength division multiplex), a plurality of first optical fibers 4-1, . . . , n are provided corresponding to a plurality of optical transmitters 2-1, . . . , n and a plurality of third optical fibers 12-1, . . . , n are provided corresponding to a plurality of third optical receiver 14-1, . . . , n. In contrast, in the sixth embodiment of FIG. 15, an optical multiplexer 62' is provided directly after the optical transmitters 2-1, . . . , n and a common first optical fiber 4 is provided between the optical multiplexer 62' and the first phase conjugator 6. Further, an optical demultiplexer 64' is provided immediately before the optical receivers 14-1, . . . , n and a common third optical fiber 12 is provided between the second phase conjugator 10 and the optical demultiplexer 64'.

The wavelengths of signal beams outputted from the optical transmitters 2-1, . . . , n are different from each other. Accordingly, if the wavelength channel regarding the optical transmitter 2-1 and the optical receiver 14-1 satisfies the conditions of the expressions (1) to (4), then the waveform regarding the wavelength channel restores its original waveform fully at the system midpoint 16, but, since, in a strict sense, the expressions (1) to (4) cannot be satisfied regarding the other wavelength channels, the waveforms of the wavelength channels may not restore their original waveforms fully at the system midpoint 16. However, in the present invention, by performing signal setting symmetrical with respect to the system midpoint 16, with regard to any wavelength channel whose waveform does not restore its original waveform fully at the system midpoint 16, the waveform can restore its original waveform fully on the reception side.

Figure 16:
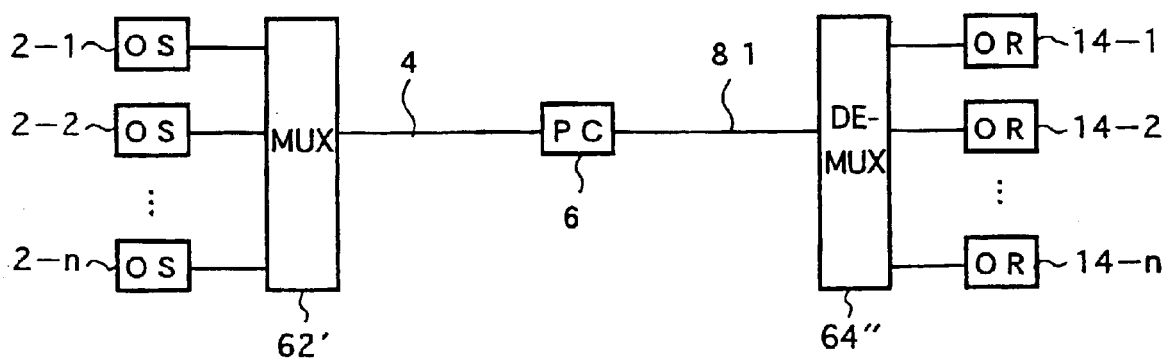
FIG. 16 is a block diagram showing a seventh embodiment of an optical communication system of the present invention.

Referring to FIG. 16, there is shown a seventh embodiment of the present invention. Here, the second portion 82 of the second optical fiber 8, the phase conjugator 10 and the third optical fiber 12 of FIG. 15 are omitted, and an optical demultiplexer 64'' is provided at the system midpoint 16. A design example of dispersion parameters where the phase conjugator 6 of FIG. 16 has a third-order nonlinear optical medium is described.

Figure 17A:
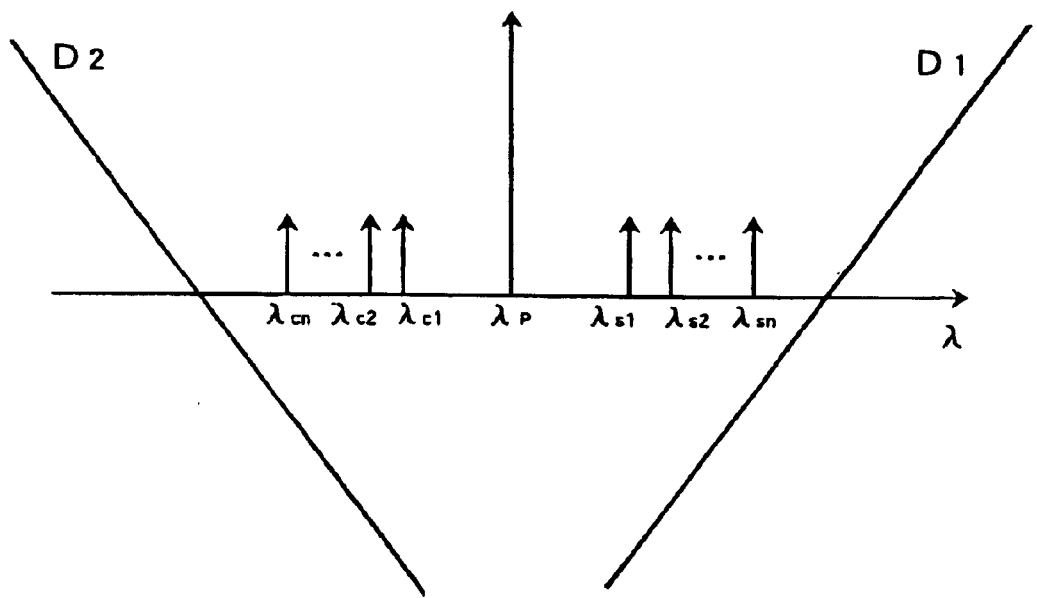
FIGS. 17A and 17B are diagrammatic views showing design examples of a dispersion parameter in the system of FIG. 16.

As seen from FIG. 17A, where the wavelengths of signal beams outputted from the optical transmitters 2-1, . . . , n are represented by $\lambda_{s1}, \ldots, \lambda_{sn}$, respectively, the wavelength $\lambda_{c1}, \ldots, \lambda_{cn}$ of phase conjugate beams outputted from the phase conjugator 6 are disposed at positions symmetrical with the wavelengths $\lambda_{s1}, \ldots, \lambda_{sn}$ of the signal beams with respect to the wavelength $\lambda_p$ of pump light. If it is assumed that, in the system of FIG. 16, for the optical fiber 4 and the first portion 81 before and after the phase conjugator 6, optical fibers of a same type are used and the fibers have a characteristic that the dispersion parameter varies relying upon the wavelength as indicated by $D_1$ in FIG. 17A, then since the chromatic dispersions that the signal beams undergo are different for individual channels, the compensation may become incomplete. Therefore, in the example shown in FIG. 17A, where a fiber having such a characteristic as indicated by $D_1$ is used for the first optical fiber 4 in which signal beams of the wavelengths $\lambda_{s1}, \ldots, \lambda_{sn}$ propagate, a fiber having such a characteristic symmetrical with $D_1$ with respect to the wavelength $\lambda_p$ of the pump light as indicated by $D_2$ is used for the first portion 81 in which phase conjugate beams of the wavelengths $\lambda_{c1}, \ldots, \lambda_{cn}$ propagate. For example, where the dispersion gradient (second-order dispersion; wavelength differentiation of a dispersion parameter) of the first optical fiber 4 is in the positive, the dispersion gradient of the first portion 81 is set to the negative. By making the chromatic dispersion that a signal beam of each channel undergoes and the chromatic dispersion that a corresponding phase conjugate beam undergoes equal to each other in this manner, the chromatic dispersion and the nonlinearity can be compensated for for each channel.

Particularly where WDM is applied, although waveform deterioration is caused not only by SPM which occurs with each channel but also by XPM (cross phase modulation) by a mutual action between channels, the XPM can be compensated for by designing the dispersion parameters in such a manner as illustrated in FIG. 17A. It is to be noted that, where a DD-DCF is applied to the embodiment of FIG. 16, for example, a DD-DCF having a characteristic of that of FIG. 17A shifted in a vertical direction can be used for each of the DD-DCFs.

Figure 17B:
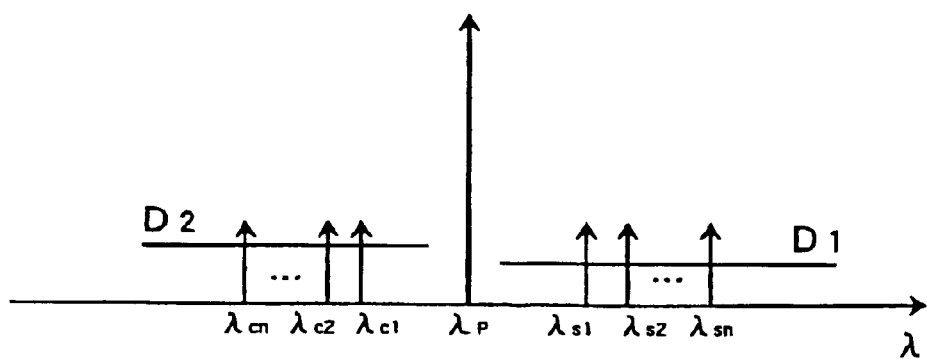

Also fibers having no dispersion gradient as seen in FIG. 17B can be used. In particular, before and after the first phase conjugator 6, a fiber whose dispersion parameter D1 does not vary in accordance with the wavelength is used for the optical fiber 4 while another fiber whose dispersion parameter $D_2$ does not vary in accordance with the wavelength is used for the first portion 81. By using fibers which do not have a dispersion gradient in this manner, not only wavelength deterioration by SPM and XPM but also FWM between channels can be compensated for. Since the occurrence efficiency of FWM relies upon the dispersion value of each fiber, it is desirable to make the dispersion parameters of the first optical fiber 4 and the first portion 81 equal to each other. It is to be noted that, since the occurrence efficiency of FWM between channels has a polarization dependency, where WDM is applied as seen in FIG. 16, it is preferable to provide a polarizing scrambler immediately after each of the optical transmitters 2-1, . . . , n or immediately after the optical multiplexer 62'. Further, the DD-DCFs may be constructed using fibers having such a characteristic as seen in FIG. 17B.

Figure 18A:
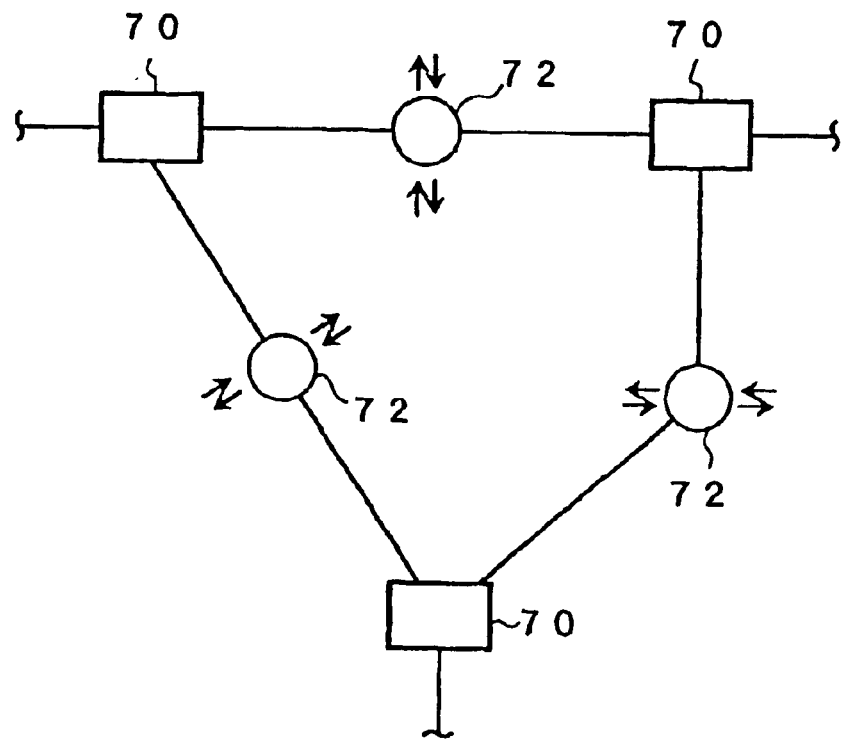
FIGS. 18A and 18B are block diagrams showing examples of an optical network to which the present invention can be applied.
Figure 18B:
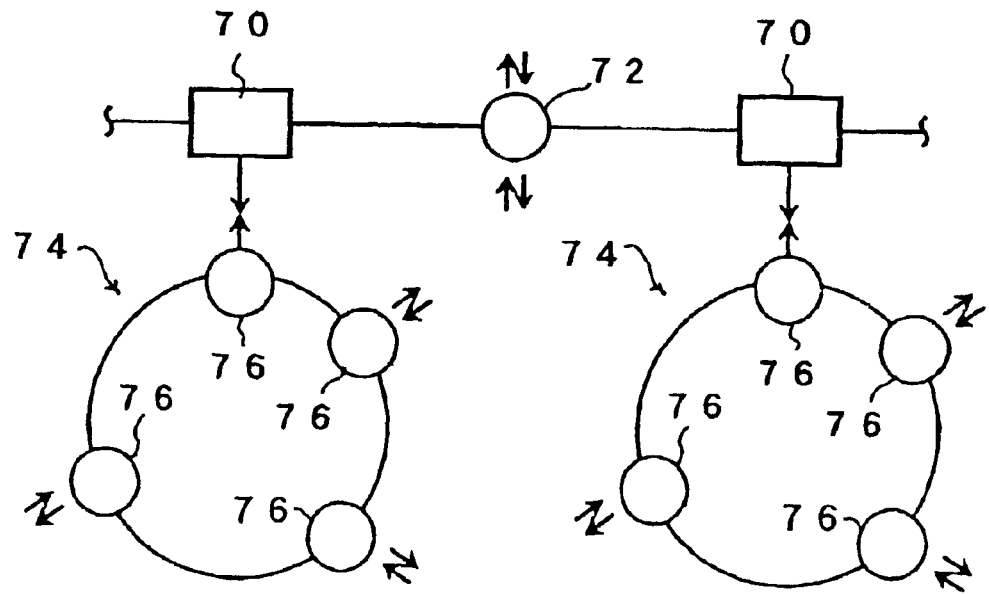

Referring to FIGS. 18A and 18B, there is shown an optical network to which the present invention can be applied. In the optical network shown in FIG. 18A, three terminal stations 70 are connected to each other by optical fibers, and a node 72 for adding/dropping an optical signal is provided intermediately of each of the optical fibers. Each of the terminal stations 70 has the phase conjugator 6 or 10 of FIG. 1 so that the conditions of the present invention may be satisfied for each of the optical fibers. Each of the nodes 72 is disposed at the system midpoint 16 (refer to FIG. 1) according to the present invention. Since the waveform restores its original waveform at each system midpoint, by disposing the nodes 72 at the system midpoints, adding/dropping of an optical signal is allowed without taking deterioration of the waveform into consideration.

Where WDM is applied to the optical network of FIG. 18A, each of the terminal stations 70 preferably has a phase conjugator for each channel of WDM. Where each of the terminal stations 70 has a plurality of phase conjugators in this manner, when an optical signal passes each terminal station 70, phase conjugate conversion and wavelength conversion are performed for each channel, branching or change-over (cross connection) of an optical signal can be performed by each of the terminal stations 70.

In the optical network shown in FIG. 18B, two terminal stations 70 are disposed on a main line, and a node 72 is provided between the terminal stations 70. Each of the terminal stations 70 is connected to a sub system 74. Each of the sub systems 74 has a ring-like optical fiber network and a plurality of nodes 76 provided intermediately of the optical fiber network.

With the construction described above, for example, where WDM is applied to the main line network, by allocating channels of WDM individually to the sub systems 74, a comparatively low speed LAN (local area network) can be provided readily.

Figure 19:
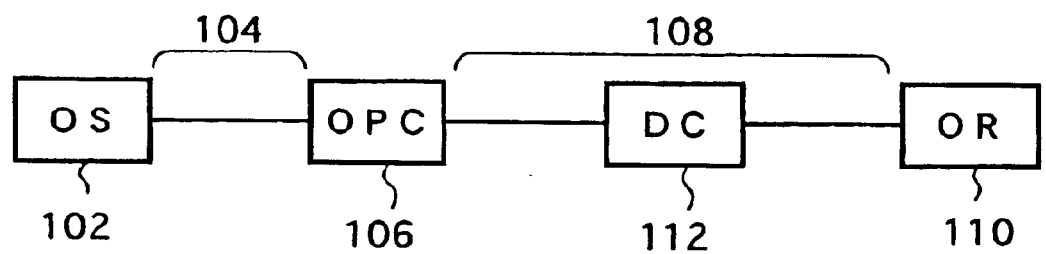
FIG. 19 is a block diagram showing another basic construction of an optical fiber communication system of the present invention.

Referring to FIG. 19, there is shown another basic construction of an optical communication system according to the present invention. The present system includes an optical transmitter 102 for outputting a signal beam, a first optical fiber 104 for transmitting the signal beam, a phase conjugator 106 for converting the signal beam transmitted by the first optical fiber 104 into a phase conjugate beam and outputting the phase conjugate beam, a second optical fiber 108 for transmitting the phase conjugate beam, and an optical receiver 110 for receiving the phase conjugate light transmitted by the second optical fiber 108.

On an optical path which includes the first optical fiber 104, phase conjugator 106 and second optical fiber 108, at least one dispersion compensator 112 for providing chromatic dispersions of the opposite signs to those of the chromatic dispersions of the optical fibers 104 and 108. While, in the example shown, the dispersion compensator 112 is provided intermediately of the second optical fiber 108, the dispersion compensator 112 may be provided intermediately of the first optical fiber 104. Further, the dispersion compensator 112 may be provided at an end portion of the optical fiber 104 or 108.

Parameter setting of the first optical fiber 104 and the second optical fiber 108 is performed in conformity with parameter setting of the first optical fiber 4 and the first portion 81 of the second optical fiber 8 of the system of FIG. 1. For example, the product of the average value of the chromatic dispersion and the length of the first optical fiber 104 is set substantially equal to the product of the average value of the chromatic dispersion and the length of the second optical fiber 108. When to calculate the average value of each chromatic dispersion, the dispersion value of the dispersion compensator 112 may or may not be included.

When the system of FIG. 19 is worked, there is a demand to use a single mode fiber which provides the lowest loss and anomalous dispersion in a wavelength 1.55 $\mu$m band for the optical fiber 104 or 108. The reason is based on the fact that, firstly, optical fiber transmission lines formed from such single mode fibers are already laid in many regions and it is desirable to utilize them as they are and the fact that, secondly, when WDM is performed in the wavelength 1.55 $\mu$m band, a comparatively large anomalous dispersion occurs with a single mode fiber and consequently crosstalk between channels by XPM and FWM occurs less likely.

Where the dispersion compensator 112 is not present, if it is tried to provide the optical fiber 104 in a terminal station and use the optical fiber 108 as a transmission line, since the optical fiber 104 must be made comparatively short, for example, where the dispersion parameter of the optical fiber 108 is +18 ps/km/nm, the dispersion parameter of the optical fiber 104 must be set to a value higher than this value. However, since it is difficult in the existing circumstances to acquire an optical fiber which provides such a high anomalous dispersion, the system is limited. In contrast, since the total dispersion of the optical fiber 108 can be made low by using the dispersion compensator 112 as shown in FIG. 19, it is possible to use the optical fiber 104 which has a dispersion parameter equal to the dispersion parameter of the optical fiber 108.

While, in the example shown, the single dispersion compensator 112 is provided, setting of the conditions of the present invention can be performed readily by disposing a plurality of dispersion compensators, for example, uniformly in the longitudinal direction.

It is to be noted that, where the optical fibers 104 and 108 are each formed from a single mode fiber which provides an anomalous dispersion, an optical fiber which provides a normal dispersion can be used for the dispersion compensator 112. Further, a dispersion compensator which employs a fiber grating described hereinabove with reference to FIG. 13 may be used.

In the following, additional description of the present invention is provided. When the present invention is worked, most simply the total dispersions and/or the total nonlinear effects before and after a phase conjugator are set equal to each other as apparently seen from FIG. 2 and the expressions (22) and (23). While, in the expressions (22) and (23), $D_j$ and $\gamma_j$(j=1, 2) are handled as constants, since, in actual parameter setting, the dispersion value and the nonlinear coefficient exhibit different values depending upon the position of the fiber, in order to anticipate accuracy, average values of them are adopted.

Compensation in accordance with the expressions (22) and (23) is approximation which stands when the nonlinear effect is not very high. More particularly, the compensation is approximation effective where the length of the optical fiber or the repeating distance by optical amplifiers is sufficiently shorter than the nonlinear length of the optical fiber. For example, if a case is considered wherein signal light of an average peak power +5 dBm is transmitted by ordinary DSFs (dispersion shift fibers) whose nonlinear coefficient is 2.6 $W^{-1}$ $km^{-1}$, then the nonlinear length is 121.6 km. Accordingly, if the optical fiber length or the repeating distance by optical amplifiers is shorter than approximately 100 km, then the chromatic dispersion and the nonlinear effect can be compensated for by the approximation described above.

However, if the power becomes further higher, then the compensation comes to a limit due to the asymmetry of the optical power distribution before and after the phase conjugator by the loss of the optical fiber. In such a case, the waveform distortion by the chromatic dispersion and the nonlinear effect can be compensated for by satisfying the conditions of the expressions (20) and (21) in accordance with the present invention.

Generally, since a transmission line exhibits a loss, in order to satisfy the expressions (20) and (21), some loss compensation effect must be provided. Several methods may be possible for this. The first method is to use a gain medium of the distributed constant type for the transmission line. A Raman amplifier, an amplifier of the in-line type which employs an EDF and so forth may be used. The second method is to control the ratio between the nonlinear effect and the dispersion value. In order to compensate for a decrease of the nonlinear effect along the transmission line by a loss, either the dispersion should be decreased or the nonlinear effect should be increased along the transmission line. To vary the value of the dispersion is possible and promising by a design of the optical fiber. The value of the dispersion can be varied, for example, by varying the zero dispersion wavelength of the dispersion shift fiber (DSF) or by varying the difference in specific refractive index between the core and the clad of the fiber or the core diameter of the fiber. Meanwhile, to vary the nonlinear effect is possible by varying the nonlinear refractive index or by varying the optical power.

In order to increase the optical intensity along a transmission line which exhibits a loss, the effective core sectional area $A_{eff}$ of the fiber should be decreased gradually along the longitudinal direction of the fiber. For example, if the mode field diameter (MFD) decreases to one half, then the optical intensity increases to approximately four times. Accordingly, the loss of approximately 6 dB can be compensated for only by this. For a higher loss, the MFD must be further reduced, but if the MFD becomes too small, then the loss is increased thereby and this provides a contrary effect. A realistic minimum value of the MFD is estimated to be approximately 3 μm. If it is taken into consideration that the MFD of a 1.3 μm zero dispersion SMF (single mode fiber) is approximately 10 μm and the MFD of a 1.55 μm zero dispersion DSF (dispersion shifted fiber) is approximately 8 μm, then the loss which can be dealt with only by the MFD is approximately 10 dB for the SMF and approximately 8 dB for the DSF.

Where a further higher loss is involved, it is a possible idea to decrease the MFD and decrease the value of the dispersion. For example, if the value of the dispersion can be reduced to one half, then even where a further loss of 3 dB is involved, the ratios between the dispersion and the nonlinear effect can be made symmetrical with respect to the phase conjugator. With a dispersion compensation fiber (DCF) development of which has been proceeded in recent years, the dispersion value can be varied within a range from approximately −120 ps/nm/km to approximately −10 ps/nm/km, and besides, it is also possible to make the MFD lower than 5 μm. Accordingly, compensation for the loss of approximately 10 dB is possible by connecting a plurality of DCFs having different dispersion values from each other in cascade connection, for example, by splicing.

If it is assumed that the average dispersion of a transmission line (for example, the first portion 81 of the optical fiber 8 of FIG. 7) is −0.5 ps/nm/km, then if the average dispersion of a compensation fiber (for example, the first optical fiber 4 of FIG. 7) is set to −50 ps/nm/km, then a system can be constructed using a compensation fiber of a length equal to ¹⁄₁₀₀ that of the transmission line. In this instance, if the loss of the compensation fiber is, for example, 0.4 dB/km, then the compensation conditions can be realized by decreasing the absolute value of the dispersion value at the rate of 0.4 dB/km. If the overall length of the transmission line is 2,000 km, then a compensation fiber of 20 km is used, and the difference in dispersion value in this instance is 8 dB. It is to be noted that, while also the optical intensity in the compensation fiber must be set to approximately 100 times the optical intensity of the transmission line, if the MFD of the compensation fiber is, for example, 4 μm, then the optical power may be required to be only approximately 25 times.

In long-haul transmission wherein an optical amplifier is used, it is known that it is desirable to use a normal dispersion fiber for a transmission line in order to reduce the nonlinear distortion by noise light of the optical amplifier. Accordingly, a system construction for which a DCF described above is used is promising.

In the phase conjugator of FIG. 6, if the power of signal light or pump light supplied to the optical fiber 18 which is used as a nonlinear optical medium or phase conjugate light produced in the optical fiber 18 exceeds a threshold value of stimulated Brillouin scattering (SBS) of the optical fiber 18, then the conversion efficiency from the signal light into the phase conjugate light becomes low. In order to suppress the influence of the SBS, frequency modulation or phase modulation may be applied to at least one of the signal light and the pump light. The modulation rate in this instance is sufficient with approximately several hundreds kHz, and since this modulation rate is generally sufficiently lower than the modulation rate for signal light, there is no possibility that the transmission characteristic may be deteriorated by modulation for suppression of the SBS.

Since the nonlinear coefficient γ of an ordinary DSF (dispersion shifted fiber) is as low as approximately 2.6 $W^{-1}$ $km^{-1}$, in order to obtain a sufficient conversion efficiency where an ordinary DSF is used as a nonlinear optical medium for generating phase conjugate light such as, for example, the optical fiber 18 of FIG. 6, it is demanded to make the fiber length longer than 10 km. Accordingly, it is demanded to provide a DSF having a nonlinear coefficient γ sufficiently high to make the fiber length short. If the length of a DSF which is used as a nonlinear optical medium for generating phase conjugate light can be made short, then the zero dispersion wavelength can be managed with a high degree of accuracy, and accordingly, it becomes easy to make the wavelength of pump light coincide accurately with the zero dispersion wavelength of the DSF. As a result, a broad conversion band can be obtained. Here, the conversion band is defined as a maximum detuning wavelength (detuning frequency) of pump light and signal light in the condition that phase conjugate light of a certain power is obtained.

In order to increase the nonlinear coefficient γ defined by the expression (6), it is effective to increase the nonlinear refractive index $n_2$ or decrease the mode field diameter (MFD) which corresponds to the effective core sectional area $A_{eff}$. In order to increase the nonlinear refractive index $n_2$, for example, the clad should be doped with fluorine or a like element while the core should be doped with $GeO_2$ of a high density. By doping the core with $GeO_2$ by 25 to 30 mol %, a high value of $5 \times 10^{-20}$ $m^2/W$ or more is obtained (with an ordinary silica fiber, approximately $3.2 \times 10^{-20}$ $m^2/W$). To decrease the MFD is possible by a design of the specific refractive index difference Δ or the shape of the core. Such a design of the DSF is similar to that of the DCF (dispersion compensation fiber). For example, by doping the core with $GeO_2$ by 25 to 30 mol % and setting the specific refractive index difference Δ to 2.5 to 3.0%, a value of the MFD lower than 4 μm has been obtained. As a synthetic effect of them, a value of the nonlinear coefficient γ higher than 15 $W^{-1}$ $km^{-1}$ has been obtained.

As another important factor, it is listed that a DSF which provides a nonlinear coefficient γ having such a high value as mentioned above should have a zero dispersion wavelength included in a pump band. Such coincidence between the zero dispersion wavelength and the pump band is possible by setting fiber parameters (for example, the specific refractive index difference Δ and the MFD) in the following manner. In an ordinary optical fiber, as the specific refractive index difference Δ increases in a condition that the MFD is kept fixed, the dispersion value increases in a normal dispersion region. Such a DD-DCF which is used for pre-compensation or post-compensation using a phase conjugator as described above is realized based on such a principle as just described. Meanwhile, if the core diameter increases, then the dispersion decreases, but if the core diameter decreases, then the dispersion increases. Accordingly, a zero dispersion with respect to pump light can be obtained by first setting the MFD to a certain value which conforms with the pump band and then adjusting the core diameter so that the zero dispersion wavelength may coincide with a value of the pump light set in advance.

The conversion efficiency ηc of an optical fiber of a loss α can be approximated by $$\eta c = exp(-\alpha L)(\gamma P_p L)^2 \quad (24)$$

where $P_p$ is the average pump light power. Accordingly, a fiber whose nonlinear coefficient γ is 15 $W^{-1}$ $km^{-1}$ can achieve an equal conversion efficiency with a length of approximately 2.6/15≈1/5.7 comparing with an ordinary DSF. While an ordinary DSF requires a length of approximately 10 km as described above in order to obtain a sufficient conversion efficiency, a fiber having such a high nonlinear coefficient γ as described above can achieve a similar conversion efficiency with a length of approximately 1 to 2 km. Actually, since the loss decreases as the fiber length decreases, the fiber length can be further decreased in order to obtain an equal conversion efficiency. With a DSF of such a small length, the controllability of the zero dispersion wavelength is augmented, and accordingly, the wavelength of the pump light can be made accurately coincide with the zero dispersion wavelength and a broad conversion band can be obtained. Further, where the fiber length is several km, since the polarization plane maintaining capacity is secured, use of such a DSF as described above is very effective to achieve a high conversion efficiency and a broad conversion band and eliminate the polarization dependency.

In order to make four wave mixing occur effectively using an optical fiber, it is important to match the phases of pump light and phase conjugate light. The phase mismatching amount Δk is approximated in the following manner:

$$\Delta k = \delta\omega^2 \beta_2(\omega_p) + 2\gamma P_p \quad (25)$$

where $\beta_2(\omega_p)$ is the chromatic dispersion at the pump light frequency $\omega_p$, and δω is the frequency difference between the signal light and the pump light. Unless pump light of a particularly high power (for example, 100 mW or more) is used, the second term of the expression (25) is sufficiently smaller than the first term, and accordingly, the second term can be ignored. Accordingly, the phase matching (to cause Δk to approach 0 infinitely) can be achieved by making the wavelength of the pump light coincide with the zero dispersion wavelength of the fiber. However, in an actual fiber, since the zero dispersion wavelength fluctuates in the longitudinal direction, it is not easy to maintain the phase matching condition over the overall length of the fiber.

In this manner, in an apparatus which includes an optical fiber as a nonlinear optical medium for generating phase conjugate light, the conversion band is limited by the dispersion of the optical fiber. Accordingly, if an optical fiber is produced wherein the dispersion thereof in the longitudinal direction is controlled fully so that the optical fiber has, for example, a single zero dispersion wavelength over the overall length (accurately, the nonlinear length), then a conversion band which is infinitely great in fact (so broad that there is no limit within a range within which the dispersion gradient exhibits a straight line) is obtained by adjusting the pump light wavelength to the zero dispersion wavelength. Actually, however, since the zero dispersion wavelength fluctuates along the longitudinal direction because of a problem in a technique of production of an optical fiber, the phase matching condition is displaced from its ideal condition, and the conversion band is limited thereby.

However, even in such a case as just described, by cutting an optical fiber to divide it into a plurality of small intervals (or sections) and joining each two intervals which have similar zero dispersion wavelengths to each other by splicing or the like (in an order different from the initial order as counted from an end of the fiber), an optical fiber suitable for provision of a phase conjugator which has a broad conversion band although the average dispersion over the overall length is equal can be obtained.

Or else, a large number of fibers of a length (for example, several hundreds m or less) with which dispersion control is possible with such a degree as is necessary to obtain a sufficiently broad conversion band are prepared in advance, and those fibers which have required zero dispersion wavelengths are spliced in combination to obtain a fiber of a length necessary to obtain a required conversion efficiency. Then, by providing a phase conjugator using the fiber, a broad conversion band can be obtained.

Where the conversion band is expanded in this manner, since the power of the pump light is high in the proximity of the pump light input end of the nonlinear optical medium, it is effective to gather those portions which have shorter zero dispersion wavelengths or those portions whose fluctuations in zero dispersion wavelength are smaller in the proximity of the pump light input end. Further, by successively increasing the dividing number in accordance with the necessity or, at a position which is spaced away from the pump light input end and at which the dispersion value is comparatively high, by suitably combining the fibers by disposing them such that the positive and negative signs of the dispersion values appear alternately or the like, the conversion band can be further increased.

In order to determine, when an optical fiber is to be divided, to which degree each section should be made short to achieve a sufficient effect, for example, the nonlinear length should be used as a standard. Similarly as in compensation for the nonlinear effect, in FWM (four wave mixing) in a fiber which is sufficiently short comparing with the nonlinear length, it can be considered that the phase matching relies upon the average distribution value of the fiber. As an example, in FWM wherein a fiber whose nonlinear coefficient γ is 2.6 $W^{-1}$ $km^{-1}$ and pump light power of approximately 30 mW is used, since the nonlinear length is approximately 12.8 km, approximately one tenth the length, that is, approximately 1 km, is considered as a standard. As another example, in FWM wherein a fiber whose nonlinear coefficient γ is 15 $W^{-1}$ $km^{-1}$ and pump light power of approximately 30 mW is used, since the nonlinear length is approximately 2.2 km, one tenth the length, that is, 200 m, may be considered as a standard. Anyway, if the average zero dispersion wavelengths of fibers which are sufficiently short comparing with the nonlinear lengths are measured and those fibers which have substantially equal values are combined to provide a nonlinear optical medium having a required conversion efficiency, then a phase conjugator of a broad conversion band can be obtained.

In this manner, according to the present invention, a first method for producing an apparatus which has a nonlinear optical medium for generating phase conjugate light is provided. In this method, a nonlinear optical medium is provided by cutting an optical fiber into a plurality of intervals first, and then re-arranging and joining together a plurality of ones of the intervals so that the conversion band in nondegenerative four wave mixing in which the nonlinear optical medium is used may be maximum. Phase conjugate light is generated by supplying pump light and signal light to the nonlinear optical medium. Since the conversion band from the signal light to the phase conjugate light is sufficiently broad, for example, where WDM signal light obtained by wavelength division multiplexing a plurality of optical signals having different wavelengths from each other is used as the signal light, the plurality of optical signals are collectively converted into phase conjugate light (a plurality of phase conjugate light signals).

Preferably, the dispersion value (for example, the dispersion value with regard to pump light) of each of the plurality of intervals is measured, and the plurality of intervals are re-arranged so that those intervals which have comparatively low dispersion values are disposed on the side nearer to an input end when the pump light is inputted to the nonlinear optical medium. Consequently, since the phase matching conditions can be obtained effectively at a portion where the power of the pump light is high, the conversion band is expanded effectively.

Preferably, at least some of the plurality of intervals are joined together such that the positive and negative signs of the dispersion values appear alternately. Consequently, since the average dispersion of each portion of the optical fiber can be suppressed low, effective expansion of the conversion band can be achieved.

Further, according to the present invention, a second method for producing an apparatus which includes a nonlinear optical medium for generating phase conjugate light is provided. In this method, a nonlinear optical medium is obtained by cutting an optical fiber into a plurality of intervals first, then measuring the dispersion value (for example, the dispersion value with regard to pump light) of each of the plurality of intervals and then selecting and joining together only those of the intervals which have dispersion values sufficiently low to obtain a required conversion band by nondegenerative four wave mixing in which the nonlinear optical medium is used. Also where a phase conjugator is implemented using the nonlinear optical medium obtained by the present second method, since a broad conversion band is obtained, collective conversion of WDM signal light is possible.

While, in each of the first and second methods according to the present invention, an optical fiber is first cut into a plurality of intervals, the present invention is not limited to this. For example, an optical fiber may be cut in the following manner in accordance with the necessity.

In particular, according to the present invention, a third method for producing an apparatus which includes a nonlinear optical medium for generating phase conjugate light is provided. In the present method, the deviation of the zero dispersion wavelength of an optical fiber is measured, and then, if the measured deviation exceeds a range determined in advance, then the optical fiber is cut so that the resulting fibers may have deviations in zero dispersion wavelength which remain within the range, whereafter the optical fiber or the cut fibers each having a zero dispersion wavelength substantially equal to the wavelength of pump light are selected and the selected fibers are joined together to obtain a nonlinear optical medium.

Measurement of a deviation of the zero dispersion wavelength can be performed using, for example, that the generation efficiency of four wave mixing is different in accordance with the zero dispersion wavelength. While generally a chromatic dispersion can be determined by measuring a wavelength dependency of the group velocity, since the phase matching in four wave mixing exhibits the best condition when the pump light wavelength and the zero dispersion wavelength coincide with each other as described hereinabove, the zero dispersion wavelength can be determined as a pump light wavelength which provides a maximum occurrence efficiency by measuring generation efficiencies of four wave mixing (phase conjugate light) with respect to pump light wavelengths in a condition wherein the wavelength difference between pump light and signal light is kept to a comparatively high fixed value of, for example, approximately 10 to 20 nm. Further, the generation efficiency of four wave mixing increases in proportion to the square of the intensity of pump light. Accordingly, when the zero dispersion wavelength exhibits a variation in the longitudinal direction of the optical fiber, zero dispersion wavelengths which are different between where signal light and pump light are inputted from one end face of an optical fiber and where signal light and pump light are inputted from the other end face are measured usually. Accordingly, a deviation in zero dispersion wavelength of the optical fiber can be determined based on the two measurement values of the zero dispersion wavelength. This is described more particularly.

Figure 20:
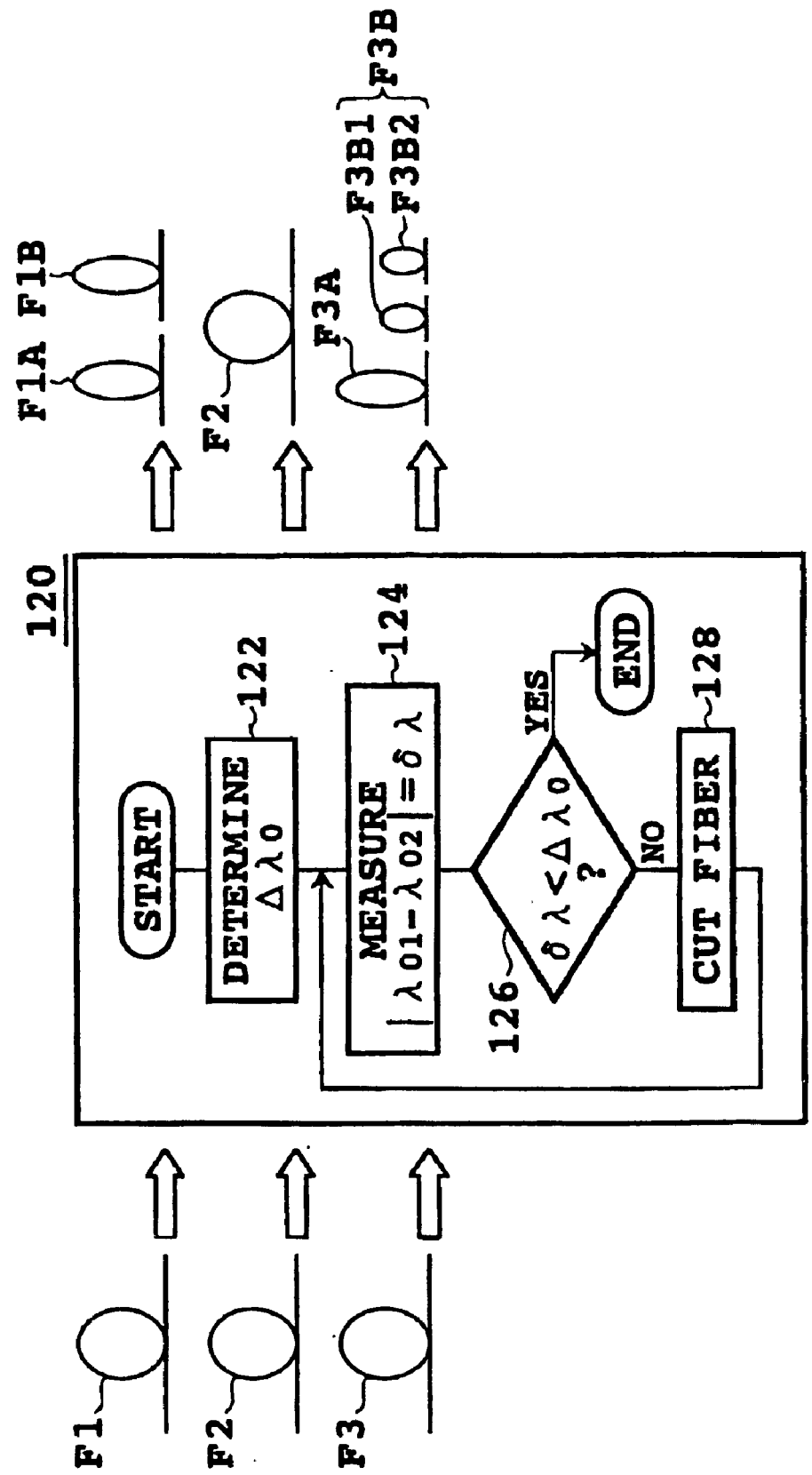
FIG. 20 is a diagrammatic view illustrating an embodiment of a manufacturing process of a nonlinear optical medium according to the present invention.

Referring to FIG. 20, there is illustrated a production process 120 for a nonlinear optical medium wherein the deviation of the zero dispersion wavelength is small. In step 122, the allowable range $\Delta\lambda_0$ of the zero dispersion wavelength is determined. The range $\Delta\lambda_0$ can be determined as a requested characteristic of a system from a required conversion band, and a concrete value of it is, for example, 2 nm. Then, in step 124, the deviation $\delta\lambda$ of the zero dispersion wavelength is measured. For example, if an optical fiber F1 is given, then the zero dispersion wavelength $\lambda_{01}$ obtained when signal light and pump light are inputted from a first end of the optical fiber F1 and the zero dispersion wavelength $\lambda_{02}$ obtained when signal light and pump light are inputted from a second end of the optical fiber F1 are measured depending upon the generation efficiency of four wave mixing described above. In this instance, $|\lambda_{01}-\lambda_{02}|$ can be used as an alternate value of the deviation $\delta\lambda$ of the zero dispersion wavelength.

Then in step 126, it is discriminated whether or not the deviation $\delta\lambda$ is smaller than the range $\Delta\lambda_0$. Here, the succeeding flow is described under the assumption that $\delta\lambda \geq \Delta\lambda_0$. In step 128, the optical fiber F1 is divided into two optical fibers F1A and F1B by cutting. After step 128, the control returns to step 124, in which the deviation $\delta\lambda$ is measured for each of the optical fibers F1A and F1B and discrimination is performed for each measurement value in step 126. Here, if it is assumed that each deviation $\delta\lambda$ is smaller than $\Delta\lambda_0$, then the flow comes to an end. It is to be noted that the cutting point of the optical fiber F1 in step 128 is arbitrary, and accordingly, the lengths of the optical fibers F1A and F1B may be equal to each other or may be different from each other.

While, in the description above, steps 124 and 126 are repeated, steps 124 and 126 may not be repeated or may be repeated by a greater number of times. For example, if an optical fiber F2 wherein the deviation of the zero dispersion frequency is small is given, then the condition is satisfied in the first time discrimination of step 126, and in this instance, the optical fiber F2 is not cut. On the other hand, if an optical fiber F3 whose zero dispersion wavelength exhibits a great variation in the longitudinal direction, then the optical fiber F3 is divided into optical fibers F3A and F3B in step 128 for the first time, and then, if it is discriminated in the second discrimination step 126 that the optical fiber F3A satisfies the condition but the optical fiber F3B does not satisfy the condition, then the optical fiber F3B may be divided into optical fibers F3B1 and F3B2 in step 128 for the second time and the flow may come to an end. In this instance, the three optical fibers F3A, F3B1 and F3B2 are obtained from the original optical fiber F3, and the deviation of the zero dispersion wavelength of each fiber is smaller than the allowable range $\Delta\lambda_0$.

A plurality of optical fiber pieces (F1A, F1B, . . . ) obtained in this manner are put in order for different values of the zero dispersion wavelength, and those optical fiber pieces having zero dispersion wavelengths substantially equal to the wavelength of pump light for four wave mixing are selected and joined together until a length with which a required conversion coefficient can be obtained is reached. By this, a nonlinear optical medium wherein the deviation of the zero dispersion wavelength in the longitudinal direction is very small can be obtained. By implementing a phase conjugator using this nonlinear optical medium, a broad conversion band can be obtained.

Even if the values of the zero dispersion wavelengths $\lambda_{01}$ and $\lambda_{02}$ are substantially coincident with each other, also an optical fiber wherein the zero dispersion wavelength exhibits a large deviation in the longitudinal direction is presumable. This is a case wherein, for example, the distribution of the zero dispersion wavelength in the longitudinal direction is symmetrical with respect to the center of the optical fiber in the longitudinal direction. In such an instance, prior to the process 120, division of the optical fiber at least into two optical fiber pieces is performed, and then the process 120 should be applied to each of the optical fiber pieces. Or, the process 120 may be repeated by a plurality of numbers of times.

From an experiment, it has become apparent that a phase conjugator implemented using a nonlinear optical medium obtained by the method of the present invention has a conversion band broader than 40 nm for a signal of 10 Gb/s. This phase conjugator has a substantially fixed value −10.9 dB as a conversion efficiency under the pump light power of +15 dBm without depending upon the detuning wavelength within a range of the detuning wavelength between signal light and pump light which exceeds 21 nm. In particular, the conversion band is broader than 40 nm. This nonlinear optical medium particularly is a highly nonlinear dispersion-shifted fiber (HNL-DSF: highly nonlinear dispersion-shifted fiber) of 750 m. The HNL-DSF was obtained by splicing three intervals individually of 250 m. The average zero dispersion wavelengths of the individual intervals were 1,547.3 nm, 1,546.3 nm and 1,548.4 nm, respectively. The average zero dispersion wavelength of the HNL-DSF as a result was measured to be 1,547.2 nm. The MFD (mode field diameter) was 3.8 $\mu$m, the nonlinear coefficient $\gamma$ was 20.4 $W^{-1}$ $km^{-1}$, and the dispersion gradient was 0.032 $ps/nm^2/km$.

In this manner, by using an optical fiber having a high nonlinear coefficient and applying the present invention to restrict the deviation of the zero dispersion wavelength substantially within ±1 nm, provision of a phase conjugator which exhibits a high conversion efficiency and has a broad conversion band is possible. If it is taken into consideration that the conversion band of a conventional phase conjugator which has an optical fiber as a nonlinear optical medium is several nm to the utmost, then advantages achieved by the method of the present invention are not self-evident from or are non-obvious or critical over the prior art. Particularly where collective conversion of WDM signal light is performed between optical networks using a phase conjugator as in such an embodiment as hereinafter described, expansion of the conversion band by the present invention is very effective.

Nonlinear optical media obtained by the first, second and third methods according to the present invention can be adopted for the optical fiber 18 for the phase conjugator of FIG. 6. In this instance, since the coincidence between the wavelength of pump light outputted from the laser diode 20 and the zero dispersion wavelength of the optical fiber 18 can be maintained with a high degree of accuracy, a broad conversion band can be obtained.

Figure 21:
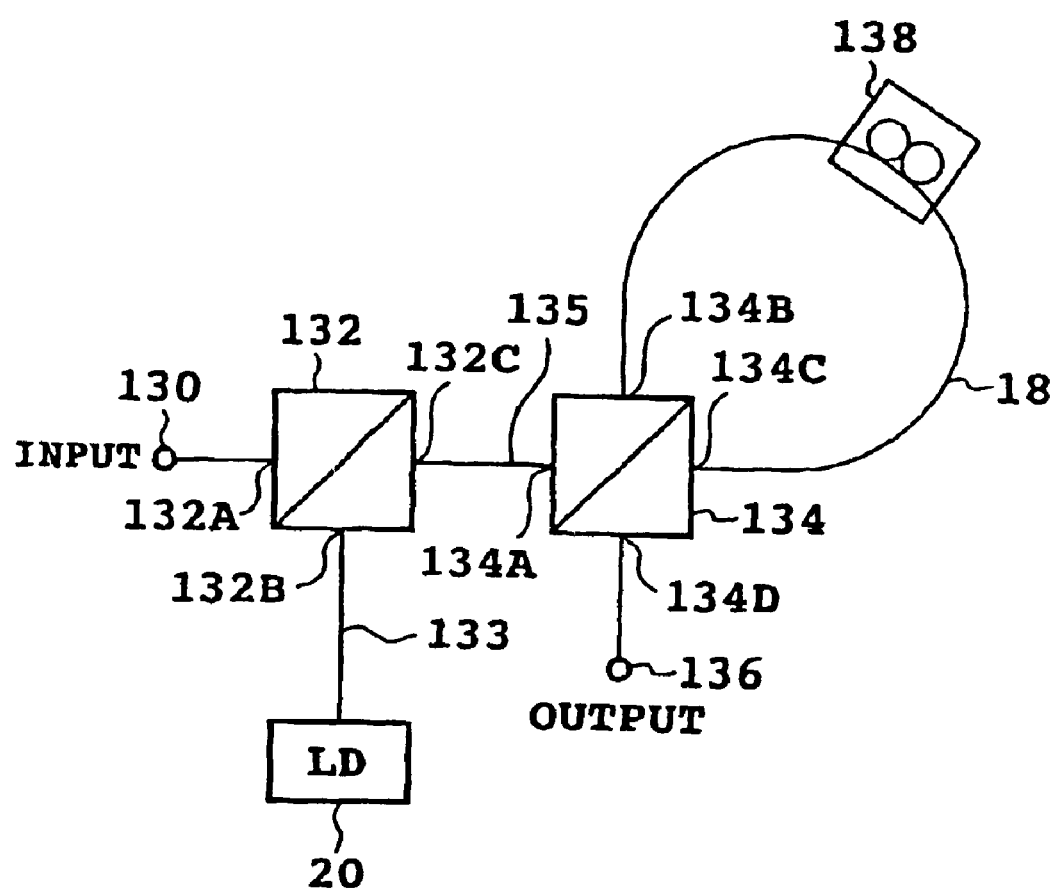
FIG. 21 is a block diagram showing a construction example of another phase conjugate light generator which can be applied to the present invention.

Referring to FIG. 21, there is shown another construction example of the phase conjugator. The present phase conjugator uses an optical fiber 18 similar to that in FIG. 6 as a nonlinear optical medium. The optical fiber 18 is preferably provided by the first, second or third method according to the present invention. Further, as a pump light source, a laser diode 20 is used. In order to guide signal light and pump light bidirectionally in the optical fiber 18 serving as a nonlinear optical medium, an optical coupler 132 and a polarizing beam splitter 134 are used. The optical coupler 132 has ports 132A, 132B and 132C and outputs light supplied to the ports 132A and 132B from the port 132C. An input port 130 is connected to the port 132A, and the port 132B is connected to the laser diode 20 serving as a pump light source by an optical fiber 133. The polarizing beam splitter 134 has ports 134A, 134B, 134C and 134D. The ports 134A and 134B, and the ports 134C and 134D, are coupled by a first polarization plane (for example, a polarization plane perpendicular to the plane of FIG. 21). The ports 134A and 134C, and the ports 134B and 134D, are coupled by a second polarization plane (for example, a polarization plane parallel to the plane of FIG. 21) perpendicular to the first polarization plane. The port 134A is connected to the port 132C by an optical fiber 135, and the optical fiber 18 serving as a nonlinear optical medium is connected between the ports 134B and 134C while the port 134D is connected to an output port 136. A polarization controller 138 which is formed in an ordinary manner using a quarter-wave plate, a half-wave plate and so forth is provided intermediately of the optical fiber 18, and the polarization controller 138 controls so that the polarization conditions of an input and an output of the optical fiber 18 may coincide with each other.

Signal light from the input port 130 and pump light from the laser diode 20 are supplied to the port 134A of the polarizing beam splitter 134 through the optical coupler 132. The signal light and the pump light thus supplied are separated into first and second polarization components having first and second polarization planes, respectively, by the polarizing beam splitter 134. The first and second polarization components propagate in the opposite directions to each other in the optical fiber 18. In this instance, in the optical fiber 18, two phase conjugate components which propagate in the opposite directions to each other are generated by four wave mixing. In particular, the phase conjugate component which has the first polarization plane propagates from the port 134B toward the port 134C, but the phase conjugate component having the second polarization plane propagates from the port 134C toward the port 134B. The first and second phase conjugate components supplied to the polarizing beam splitter 134 are polarization combined, and the resultant phase conjugate light is outputted from the port 134D toward the output port 136.

The polarization plane of the pump light outputted from the laser diode 20 is preferably set such that the distribution ratio of the pump light to the first and second polarization components separated by the polarizing beam splitter 134 may be 1:1. For example, the laser diode 20 is set so that the polarization plane of the pump light to be supplied to the port 134A of the polarizing beam splitter 134 is inclined by approximately 45 degrees with respect to both of the first and second polarization planes. As a result of such setting, since the two orthogonal polarization components of the pump light act in coincident polarization planes on the two orthogonal polarization components of the signal light which are guided in the opposite directions to each other in the optical fiber 18, irrespective of the variation of the polarization condition of the signal light at the input port 130, phase conjugate light of a fixed intensity can be obtained. In other words, provision of a phase conjugator wherein the generation efficiency does not rely upon the polarization condition of input signal light is possible.

In order that the polarization plane of pump light to be supplied to the port 134A of the polarizing beam splitter 134 may be inclined by approximately 45 degrees with respect to both of the first and second polarization planes, it is required to maintain the polarization plane of pump light, which is outputted as a substantially linearly polarized wave from the laser diode 20, and supply the pump light to the port 134A. To this end, a polarization maintaining fiber (PMF) can be used for each of the optical fibers 133 and 135. The PMF has a principal axis in a diametrical direction. The PMF maintains the polarization condition of a polarization component having a polarization plane parallel to the principal axis or another polarization component having a polarization plane perpendicular to the principal axis to propagate the polarization component. Accordingly, in order to make the polarization plane of pump light inclined by 45 degrees with respect to the second polarization plane at the port 134A, the principal axis of the PMF used as the optical fiber 135 should be inclined by 45 degrees with respect to the first and second polarization planes.

However, where a PMF is used as the optical fiber 135, also signal light which is not necessarily limited to a linearly polarized wave passes through the PMF, and polarization dispersion may be caused by a delay between two orthogonal polarization modes of the signal light which passes through the PMF. In order to cope with the polarization dispersion, the PMF to be used for the optical fiber 135 should be provided by connecting first and second PMFs having substantially equal lengths to each other by splicing. At the splicing connection point, the first principal axis of the first PMF and the second principal axis of the second PMF extend perpendicularly to each other, and consequently, the delay between the polarization modes is cancelled and the polarization dispersion is eliminated. For example, where the first principal axis is inclined by 45 degrees in the clockwise direction with respect to the first polarization plane, the second principal axis is inclined by 45 degrees in the counterclockwise direction with respect to the first polarization plane.

It is to be noted that, as described hereinabove, where the nonlinear coefficient of the optical fiber 18 is sufficiently high and the length of it is so short that it has a polarization plane keeping capacity, the polarization controller 138 can be omitted.

In this manner, according to the present invention, a phase conjugator which has a generation efficiency which does not rely upon the polarization condition of input signal light and has a low polarization dispersion is provided. This phase conjugator includes a polarization beam splitter, a nonlinear optical medium, a pump light source, and coupling means. The polarization beam splitter has first to fourth ports. The first and second ports, and the third and fourth ports, are coupled to each other by a first polarization plane. The first and third ports, and the second and fourth ports, are coupled to each other by a second polarization plane perpendicular to the first polarization plane. The nonlinear optical medium is operatively connected between the second and third ports. The pump light source outputs pump light. The coupling means includes an optical coupler having first and second input ports for receiving signal light and pump light, respectively, and an output port, and a polarization maintaining fiber operatively connected between the output port and the first port of the polarization beam splitter. The coupling means supplies the signal light and the pump light to the first port of the polarization beam splitter.

The polarization maintaining fiber has a principal axis set so that the polarization plane of the pump light at the first port of the polarization beam splitter is inclined substantially by 45 degrees with respect to the first and second polarization planes.

Preferably, the polarization maintaining fiber includes first and second polarization maintaining fibers connected to each other by splicing, and the first and second polarization maintaining fibers have first and second principal axes which extend perpendicularly to the each other.

Figure 22:
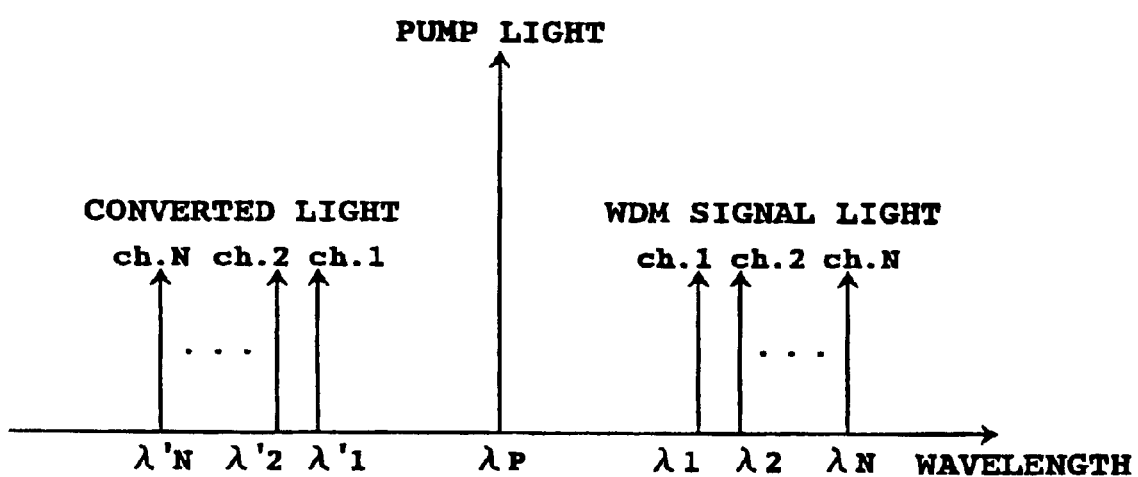
FIG. 22 is a diagram illustrating collective conversion of WDM (wavelength division multiplex) signal light by a phase conjugator having a broad conversion band.

FIG. 22 is a view illustrating collective conversion of WDM signal light by a phase conjugator having a broad conversion band. WDM signal light is obtained by wavelength division multiplexing (WDM) optical signals of N channels having wavelengths $\lambda_1, \lambda_2, \ldots, \lambda_N$ different from one another. Here, it is assumed that $\lambda_1$ is the shortest wavelength and $\lambda_N$ is the longest wavelength. The wavelength $\lambda_p$ of the pump light is set, for example, shorter than $\lambda_1$. The WDM signal light is converted into converted light by nondegenerative four wave mixing using the pump light. The converted light includes converted optical signals of N channels of wavelengths $\lambda_1', \lambda_2', \ldots, \lambda_N'$ which are different from one another. The arrangement of the optical signals of the individual channels of the WDM signal light and the converted optical signals of the converted light are symmetrical with respect to the wavelength $\lambda_p$ of the pump light.

In four wave mixing wherein an optical fiber is used as a nonlinear optical medium, since the conversion band is substantially flat, wavelength conversion and phase conjugate conversion can be performed in substantially equal conversion efficiencies for the optical signals of the individual channels. Accordingly, for each channel, waveform distortion by the chromatic dispersion and the nonlinear effect of the transmission line can be compensated for, and long-haul large-capacity transmission is possible. While, in FIG. 22, conversion from a long wavelength band to a short wavelength band is illustrated, since the conversion band by an optical fiber is symmetrical with respect to the zero dispersion wavelength, also conversion from a short wavelength band to a long wavelength band can naturally be performed in a similar manner.

Figure 23:
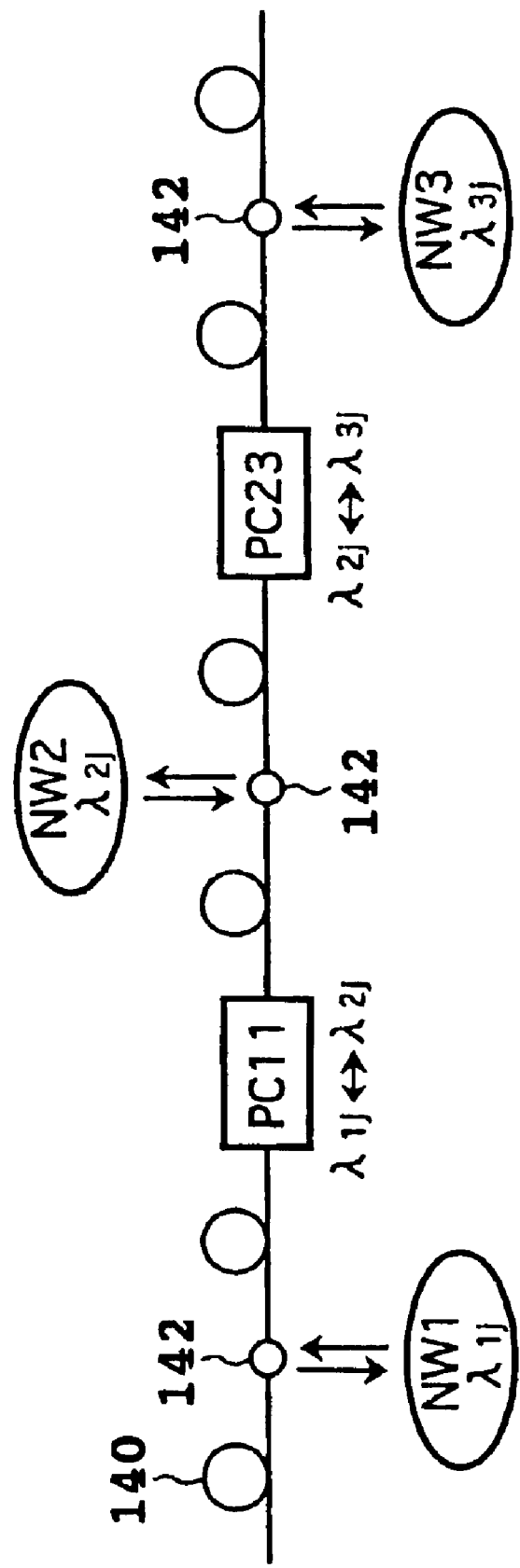
FIG. 23 is a diagrammatic view showing an embodiment of a system to which wavelength conversion and phase conjugate conversion are applied.

FIG. 23 is a block diagram showing an embodiment of a system to which wavelength conversion and phase conjugate conversion are applied. A plurality of optical fiber networks NW1, NW2 and NW3 to each of which WDM is applied are connected to each other by an optical fiber transmission line 140 and nodes 142. In order to perform conversion between the networks NW1 and NW2, a phase conjugator PC11 is provided intermediately of the optical fiber transmission line 140, and in order to perform conversion between the optical fiber networks NW2 and NW3, a phase conjugator PC23 is provided intermediately of the optical fiber transmission line 140. It is assumed that, in the optical fiber networks NW1, NW2 and NW3, WDM transmission of wavelength bands $\lambda_{1j}$, $\lambda_{2j}$ and $\lambda_{3j}$ different from each other is performed, respectively. The phase conjugator PC11 performs wavelength conversion and phase conjugate conversion between the wavelength bands $\lambda_{1j}$ and $\lambda_{2j}$, and the phase conjugator PC23 performs wavelength conversion and phase conjugate conversion between the wavelength bands $\lambda_{2j}$ and $\lambda_{3j}$. Since positions at which the waveform distortion by the chromatic dispersion and the nonlinear effect is improved most in accordance with the present invention appear intermediately of the optical fiber transmission line 140, the nodes 142 are provided individually at such positions. Each of the nodes 142 includes an optical adding/dropping apparatus for performing addition and extraction of an optical signal. The optical adding/dropping apparatus functions for all or some of channels of WDM signal light or converted light. For example, if the wavelength band $\lambda_{1j}$ of the optical fiber network NW1 is given by the WDM signal light illustrated in FIG. 22 and the wavelength of the pump light of the phase conjugator PC11 is $\lambda_p$, then the wavelength band $\lambda_{2j}$ of the optical fiber network NW2 is given by the band of the converted light.

According such a system construction as described above, since compensation for the waveform distortion and the wavelength conversion function by a phase conjugator are utilized effectively, implementation of a long-haul large-capacity system which is high in flexibility is possible. Further, application to transmission between such networks is particularly important in the following points recently:

(1) achievement in broader band of an optical amplifier; and (2) achievement in variety of the dispersion of an optical fiber used as a transmission line.

Of the two points, (1) relates to recent achievement in broader band of an EDFA (erbium-doped fiber amplifier), and (2) relates to achievement in higher speed of a transmission signal and dispersion control for performing WDM transmission. Recently, an EDFA which has such a broad band as exceeds 50 nm and is superior in flatness of the gain directed to WDM has been developed. It is estimated that, in future, the band is further expanded and an EDFA of a broad band of approximately 60 to 80 nm is developed. Naturally, while such an increase of the band of an EDFA contributes to an increase in number of channels (transmission capacity) of WDM, introduction of a new concept in such transmission between networks as illustrated in FIG. 23 is allowed.

Figure 24:
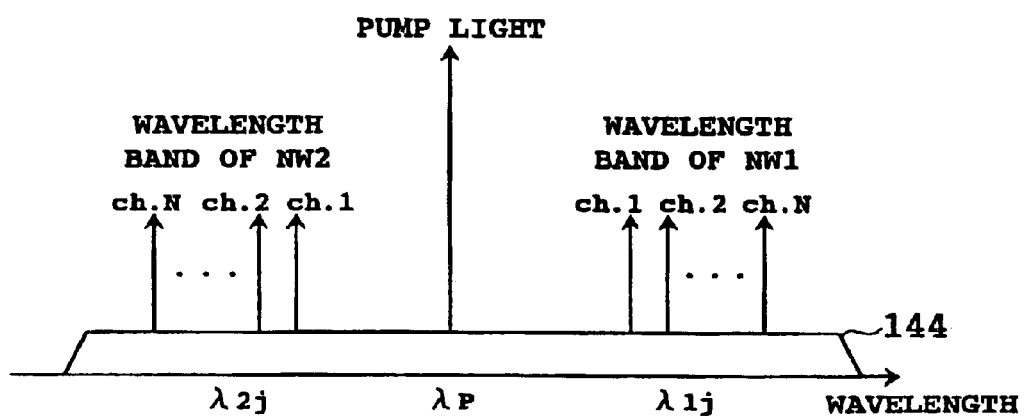
FIG. 24 is a diagrammatic view illustrating a setting example of a wavelength band in FIG. 23.

For example, where the wavelength bands of the optical fiber networks NW1 and NW2 of FIG. 23 are set in such a manner as seen in FIG. 24, effective transmission according to the present invention is possible between the optical fiber networks NW1 and NW2. In FIG. 24, reference numeral 144 denotes a comparatively flat gain band of an optical amplifier (for example, an EDFA).

One of reasons why the wavelength bands to be used for the individual networks are different in this manner resides in that optical fibers as transmission lines used for the individual networks are different from each other. As optical fibers which have already been put into practical use, there are a 1.3 μm zero dispersion single mode fiber (so-called standard SMF) and a 1.55 μm dispersion shifted fiber (DSF). Meanwhile, as a result of recent development of EDFAs, the center of high-speed long-haul transmission is moving to the 1.55 μm band. While the standard SMF exhibits a high anomalous dispersion value of approximately +16 to +20 ps/nm/km, since the dispersion value of the DSF can be suppressed to a low value of approximately ±1 to 2 ps/nm/km, the DSF is more advantageous for high-speed long-haul transmission in the 1.55 μm band. However, many standard SMFs have been laid already, and also those networks which must use such standard SMFs as a transmission line are large in number. For connection from a network of such construction to another network which employs the DSF, waveform conversion into a wavelength band with which an optimum dispersion value to the DSF is provided is required, and accordingly, the present invention is effective for such an instance.

On the other hand, the present invention is effective also for connection between networks each of which the DSF is used. The reason is that, for WDM, a lower dispersion is not necessarily advantageous. For WDM of a comparatively high speed, in order to secure a required signal to noise ratio (SNR), the power level of each channel must be set considerably high. In this instance, if the dispersion of an optical fiber which is used as a transmission line is small, crosstalk between adjacent channels is caused by four wavemixing, and the transmission characteristic is deteriorated. In order to eliminate this influence, recently a fiber (Nonzero dispersion-shifted fiber) having a comparatively large dispersion whose zero dispersion wavelength is shifted by a large amount from the signal band is sometimes used. As the variety of optical fibers to be used for a transmission line has become abundant in this manner, the network constructions in various wavelength bands are possible, and in connection between such networks, such wavelength conversion and phase conjugate conversion of a broad band as in the present invention are effective.

Recently, while also the variety of EDFAs has become abundant together with optical fibers, the most popular EDFA is of the type which has a gain peak in the 1.53 μm band or the 1.55 μm band. Of the two bands, the former is called blue band and the latter is called red band.

Figure 25:
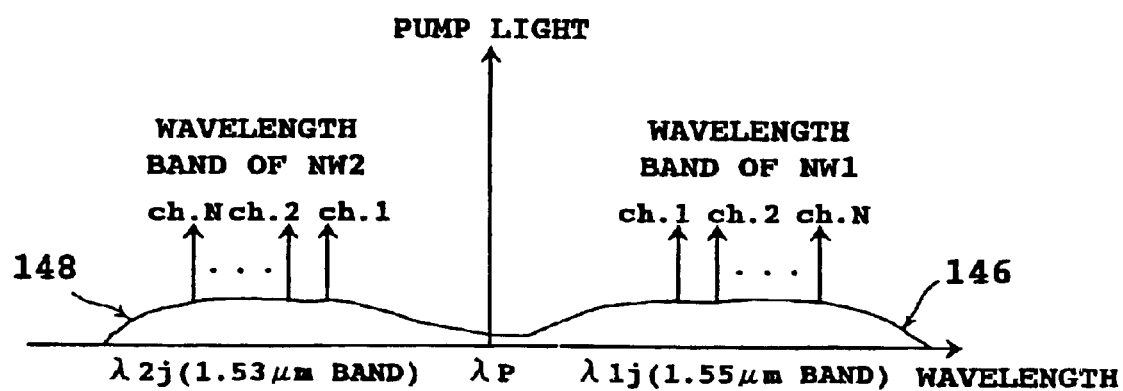
FIG. 25 is a diagrammatic view illustrating another setting example of a wavelength band in FIG. 23.

FIG. 25 is a view illustrating another setting example of a wavelength band in FIG. 23. Here, the wavelength band of the optical fiber network NW1 is included in the red band of the EDFA denoted at reference numeral 146 while the wavelength band of the optical fiber network NW2 is included in the blue band of the EDFA denoted at reference numeral 148. According to such setting, where the optical fiber transmission line 140 or each network includes an EDFA of the in-line type, red band and phase conjugate conversion can be performed readily.

Figure 26:
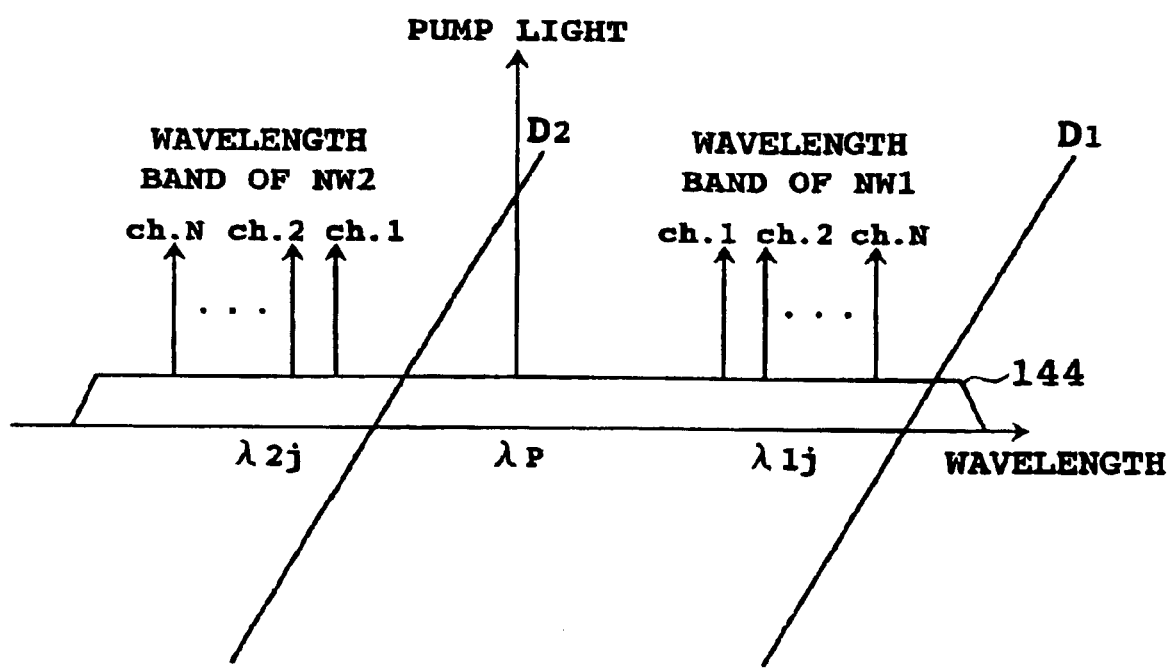
FIG. 26 is a diagrammatic view showing an example of a dispersion arrangement in FIG. 23.

FIG. 26 is a view illustrating an example of the dispersion arrangement of FIG. 23. Reference symbols $D_1$ and $D_2$ (the unit of each of which is ps/nm/km) represent dispersions of the optical fiber networks NW1 and NW2, respectively. In FIG. 26, an example wherein WDM is performed using a normal dispersion fiber in each network is illustrated. Since the channel arrangement is reversed by wavelength conversion as seen in FIG. 22, it is estimated that the influences of dispersions before and after conversion for each channel are different from each other. However, this problem can be solved by making the influences of the dispersions upon channels in the proximity of the center substantially equal to each other and performing dispersion compensation in each network. It is to be noted that the dispersion in each network may be a normal dispersion or an anomalous dispersion.

As described above, according to the present invention, there is provided an optical fiber communication system which includes a plurality of optical fiber networks for WDM signal light obtained by wavelength division multiplexing (WDM), a plurality of optical signals having wavelengths different from each other, and at least one converter for coupling the optical fiber networks to each other. Since the converter performs wavelength conversion and phase conjugate conversion of the plurality of optical signals collectively, construction of a long-haul large-capacity system which is high in flexibility is facilitated.

Figure 27:
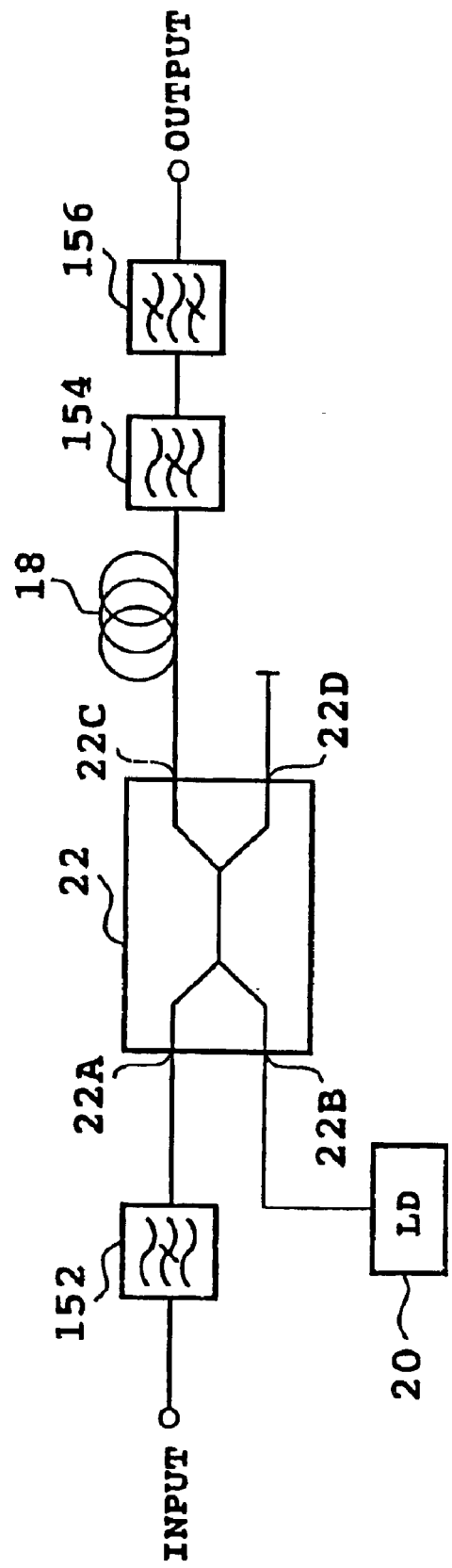
FIG. 27 is a block diagram showing an improvement to the phase conjugator shown in FIG. 6.

FIG. 27 is a view showing an improvement on the phase conjugator shown in FIG. 6. Here, first and second optical band block filters 152 and 154 and an optical band-pass filter 156 are provided additionally. Signal light (an input beam) is supplied to a port 22A of an optical coupler 22 through the first optical band block filter 152, and phase conjugate light generated in the optical fiber 18 which serves as a nonlinear optical medium is outputted after it successively passes the second optical band block filter 154 and the optical band-pass filter 156 in this order. The order in connection of the filters 154 and 156 may be reversed.

Figure 28A:
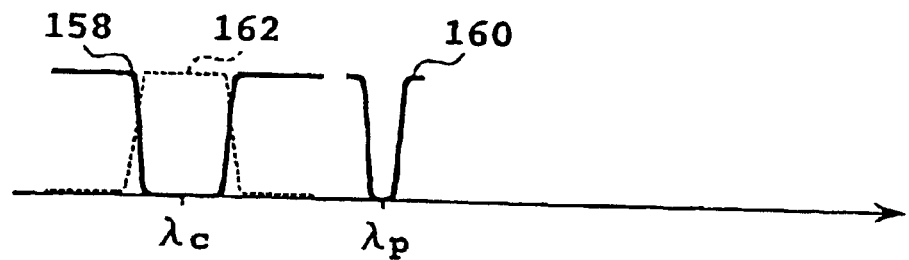
FIG. 28A is a diagram illustrating a characteristic of optical filters 152, 154 and 156 shown in FIG. 27.

Referring to FIG. 28A, characteristics of the filters 152, 154 and 156 shown in FIG. 27 are illustrated. In FIG. 28A, the axis of ordinate indicates the transmittance, and the axis of abscissa indicates the wavelength. The first optical band block filter 152 has a block band, as denoted by reference numeral 158, including a wavelength of the wavelength $\lambda_c$ of phase conjugate light generated in the optical fiber 18. In particular, the transmittance of the filter 152 in a region in the proximity of the wavelength $\lambda_c$ is substantially 0%, and the transmittance of it in the other regions than the region is substantially 100%. The second optical band block filter 154 has a comparatively narrow block band, as denoted by reference numeral 160, including the wavelength $\lambda_p$ of pump light outputted from the laser diode 20. In particular, the transmittance of the filter 154 in a region in the proximity of the wavelength $\lambda_p$ is substantially 0%, and the transmittance of it in the other regions than the region is substantially 100%. The optical band-pass filter 156 has a pass-band, as denoted by reference numeral 162, including a wavelength of the wavelength $\lambda_c$ of phase conjugate light generated in the optical fiber 18. In particular, the transmittance of the filter 156 in a region in the proximity of the wavelength $\lambda_c$ is substantially 100%, and the transmittance of it in the other regions than the region is substantially 0%.

Figure 28B:
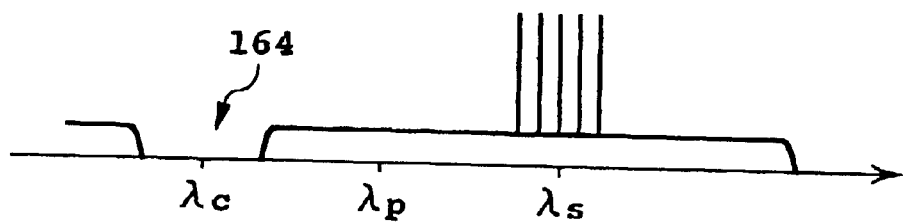
FIGS. 28B to 28D are diagrams illustrating spectra observed at different positions of the phase conjugator shown in FIG. 27.
Figure 28C:
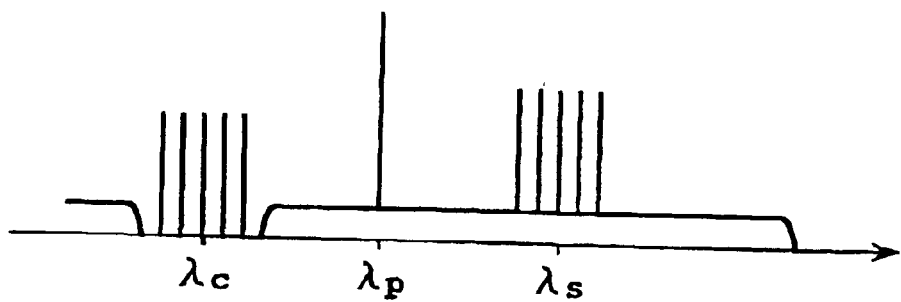
Figure 28D:
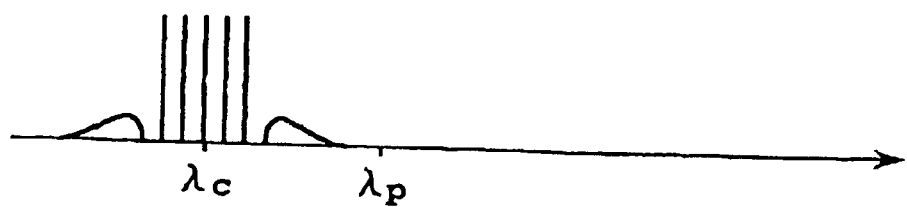

Referring to FIGS. 28B to 28D, there are shown optical spectra observed at different positions of the phase conjugator of FIG. 27. FIG. 28B shows a spectrum of an output of the first optical band block filter 152. Here, signal light is given by WDM signal light superposed on ASE light. Since the first optical band block filter 152 is used, as denoted at reference numeral 164, a window in which noise power is very low is formed in the ASE spectrum. FIG. 28C shows a spectrum of an output of the optical fiber 18. As a result of nondegenerative four wave mixing in the optical fiber 18, phase conjugate conversion and wavelength conversion are performed so that the WDM signal light is converted into converted light. The wavelength arrangements of channels between the WDM signal light and the converted light are symmetrical with respect to the wavelength $\lambda_p$ of the pump light as described hereinabove. The wavelengths of the channels of the converted light are included in the window 164. FIG. 28D shows a spectrum of an output of the optical band-pass filter 156. Since the second optical band block filter 154 has a narrow block band, the power of the pump light is suppressed effectively. Further, since the optical band-pass filter 156 is adopted, ASE light in the proximity of the window 164 is suppressed effectively.

In the embodiment of FIG. 27, since the optical band block filter 154 for removing pump light is provided on the output side of the optical fiber 18, the influence of the pump light upon the receiving station or an optical device disposed on the downstream side of the optical transmission line is reduced, and processing (extraction, amplification and so forth) of phase conjugate light can be performed readily. For example, where an optical amplifier is provided on the downstream side of the phase conjugator, if pump light having a high power is supplied to the optical amplifier, then there is the possibility that the optical amplifier may become saturated, resulting in failure to obtain a required gain. However, by adopting such a construction as shown in FIG. 27, such a problem as just described can be solved.

Particularly, in the embodiment of FIG. 27, since the optical band block filter 154 and the optical band-pass filter 156 are connected in cascade connection on the output side of the optical fiber 18, suppression of pump light can be performed effectively. Accordingly, the power of the pump light can be made high to effectively raise the conversion efficiency. For example, where it is taken into consideration that, if only the optical band-pass filter 156 is provided on the output side of the optical fiber 18, then the pump light removing capacity may possibly be low due to the production technique of the optical band-pass filter 156, the combination of the filters 154 and 156 is effective. In this sense, the advantage achieved by the embodiment of FIG. 27 that pump light and/or signal light can be removed effectively is not self-evident from or is non-obvious or critical over the prior art. The reason why, in the embodiment of FIG. 27, the optical band block filter 152 is provided on the input side of the optical fiber 18 is that it is intended to remove in advance ASE noise in the proximity of the wavelength $\lambda_c$ of phase conjugate light to be generated. As a result, deterioration of the signal to noise ratio (SNR) can be prevented. While FIG. 27 shows an improvement on the phase conjugator shown in FIG. 6, similar improvement may be made for the phase conjugator shown in FIG. 21. In this instance, the first optical band block filter 152 is provided between the input port 130 and the port 132A of the optical coupler 132, and the second optical band block filter 154 and the optical band-pass filter 156 are provided between the port 134D of the polarizing beam splitter 134 and the output port 136.

As described above, according to the present invention, as an apparatus for generating phase conjugate light, a phase conjugator which exhibits reduced deterioration in SNR and has a reduced influence on the downstream side is provided. This phase conjugator includes a nonlinear optical medium, a pump light source, and an optical band block filter. The nonlinear optical medium has a first end and a second end, and signal light is supplied to the first end. The pump light source supplies pump light from at least one of the first end and the second end into the nonlinear optical medium. The optical band block filter is operatively connected to the second end of the nonlinear optical medium. The optical band block filter has a block band including a wavelength of the pump light.

When the present invention is worked, a fiber grating may be used for the optical filters. Where the refractive index of an optical medium (for example, glass) is permanently varied by irradiation of light, the medium is called photosensitive. By using this character, the fiber grating can be produced in the core of an optical fiber. The characteristic of such a fiber grating as just mentioned is that it Bragg reflects light in a narrow band in the proximity of a resonance wavelength which is determined by the grating pitch and the effective refractive index of a fiber mode. The fiber grating can be produced, for example, by irradiating an excimer laser which is oscillated with a wavelength of 248 nm or 193 nm using a phase mask.

For example, by producing each of the optical band block filters 152 and 154 shown in FIG. 27 using a fiber grating, an accurate and narrow block band can be obtained.

INDUSTRIAL APPLICABILITY OF THE INVENTION

As described above, according to the present invention, since chromatic dispersion and nonlinearity can be effectively compensated for using a phase conjugator, provision of a long-haul large-capacity optical fiber communication system is allowed. Further, provision of a phase conjugator of a broad conversion band and a high conversion efficiency suitable for use with such a system is allowed.

What is claimed is:

1. An optical fiber communication system, comprising:
   a plurality of optical fiber networks for WDM signal light obtained by wavelength division multiplexing (WDM) a plurality of optical signals having wavelengths different from each other;
   at least one converter for coupling said plurality of optical fiber networks to each other, and including means for performing wavelength conversion and phase conjugate conversion of the plurality of optical signals collectively;
   an optical adding/dropping apparatus for the optical signals being provided at a position at which the waveform distortion of the optical signals is minimized.

2. An optical fiber communication system, comprising:
   an optical fiber network for WDM signal light obtained by wavelength division multiplexing (WDM) a plurality of optical signals having wavelengths different from each other; and
   at least one converter for coupling said plurality of optical signals collectively, wherein
   the wavelength conversion is performed between arbitrary bands included in a gain band provided by an optical amplifier.

3. The optical fiber communication system according to claim 2, wherein the optical amplifier is an erbium-doped fiber optical amplifier.

4. An optical fiber communication system, comprising:
   a plurality of optical fiber networks for WDM signal light obtained by wavelength division multiplexing (WDM) a plurality of optical signals having wavelengths different from each other; and
   at least one converter for coupling said plurality of optical fiber networks to each other, and including means for performing wavelength conversion and phase conjugate conversion of the plurality of optical signals collectively, wherein
   the wavelength conversion is performed between arbitrary bands included in a gain band provided by an erbium-doped fiber amplifier, the arbitrary bands being a 1.55 µm band and a 1.53 µm band.

* * * * *